Feb. 23, 1954 W. S. PRAEG ET AL 2,669,906

GEAR SHAPER

Filed March 24, 1948 17 Sheets-Sheet 1

INVENTORS
WALTER S. PRAEG
BY ARTHUR B. BASSOFF
Whittemore, Hulbert & Belknap
ATTORNEYS Feb. 23, 1954 W. S. PRAEG ET AL 2,669,906

GEAR SHAPER

Filed March 24, 1948 17 Sheets-Sheet 2

INVENTORS
WALTER S. PRAEG
ARTHUR B. BASSOFF
BY Whittemore, Hulbert & Belknap
ATTORNEYS Feb. 23, 1954 W. S. PRAEG ET AL 2,669,906

GEAR SHAPER

Filed March 24, 1948 17 Sheets-Sheet 3

INVENTORS
WALTER S. PRAEG
ARTHUR B. BASSOFF
BY Whittemore, Hulbert & Belknap
ATTORNEYS INVENTORS
WALTER S. PRAEG
ARTHUR B. BASSOFF
BY Whittemore, Hulbert & Belknap
ATTORNEYS INVENTORS
WALTER S. PRAEG
ARTHUR B. BASSOFF
BY Whittemore, Hulbert & Belknap
ATTORNEYS

GEAR SHAPER

Filed March 24, 1948 17 Sheets-Sheet 6

INVENTORS
WALTER S. PRAEG
ARTHUR B. BASSOFF
BY Whittemore, Hulbert & Belknap
ATTORNEYS

GEAR SHAPER

Filed March 24, 1948 17 Sheets-Sheet 7

INVENTORS
WALTER S. PRAEG
ARTHUR B. BASSOFF
BY Whittemore, Hulbert & Belknap
ATTORNEYS INVENTORS
WALTER S. PRAEG
ARTHUR B. BASSOFF
BY *Whittemore, Hulbert & Belknap*
ATTORNEYS

GEAR SHAPER

Filed March 24, 1948 17 Sheets-Sheet 9

INVENTORS
WALTER S. PRAEG
ARTHUR B. BASSOFF
BY Whittemore, Hulbert & Belknap
ATTORNEYS Feb. 23, 1954 W. S. PRAEG ET AL 2,669,906

GEAR SHAPER

Filed March 24, 1948 17 Sheets-Sheet 10

*INVENTORS*
WALTER S. PRAEG
*BY* ARTHUR B. BASSOFF
Whittemore, Hulbert & Belknap
ATTORNEYS Feb. 23, 1954 W. S. PRAEG ET AL 2,669,906

GEAR SHAPER

Filed March 24, 1948 17 Sheets-Sheet 11

INVENTORS
WALTER S. PRAEG
ARTHUR B. BASSOFF
BY Whittemore, Hulbert & Belknap
ATTORNEYS

*INVENTORS*
WALTER S. PRAEG
ARTHUR B. BASSOFF
*BY* Whittemore, Hulbert & Belknap ATTORNEYS Feb. 23, 1954 W. S. PRAEG ET AL 2,669,906

GEAR SHAPER

Filed March 24, 1948 17 Sheets-Sheet 13

INVENTORS
WALTER S. PRAEG
ARTHUR B. BASSOFF
BY Whittemore, Hulbert & Belknap
ATTORNEYS

*INVENTORS*
WALTER S. PRAEG
ARTHUR B. BASSOFF
BY Whittemore, Hulbert & Belknap
ATTORNEYS

GEAR SHAPER

Filed March 24, 1948 17 Sheets-Sheet 15

INVENTORS
WALTER S. PRAEG
ARTHUR B. BASSOFF
BY Whittemore, Hulbert & Belknap
ATTORNEYS INVENTORS
WALTER S. PRAEG
ARTHUR B. BASSOFF
BY Whittemore, Hulbert & Belknap
ATTORNEYS INVENTORS
WALTER S. PRAEG
ARTHUR B. BASSOFF
BY Whittemore, Hulbert & Belknap
ATTORNEYS Patented Feb. 23, 1954

2,669,906

UNITED STATES PATENT OFFICE 2,669,906

GEAR SHAPER

Walter S. Praeg and Arthur B. Bassoff, Detroit, Mich., assignors, by mesne assignments, to The Fellows Gear Shaper Company, Springfield, Vt., a corporation of Vermont Application March 24, 1948, Serial No. 16,636

13 Claims. (Cl. 90—7)

The present invention relates to a gear shaping machine.

It is an object of the present invention to provide a gear shaping machine characterized by its simplicity, rigidity, and adaptability to perform diverse methods of gear shaping.

It is a further object of the present invention to provide a gear shaper in which vibration is substantially reduced and production tolerances are closely maintained.

A further object is to provide for dynamic counterbalancing of the cutter spindle.

A further object is to provide for selection of continuous or intermittent infeed and rotary feed.

Other objects not enumerated above will become apparent as the description proceeds, in conjunction with the drawings, in which.

GENERAL ORGANIZATION

Figures 1, 2, 4:
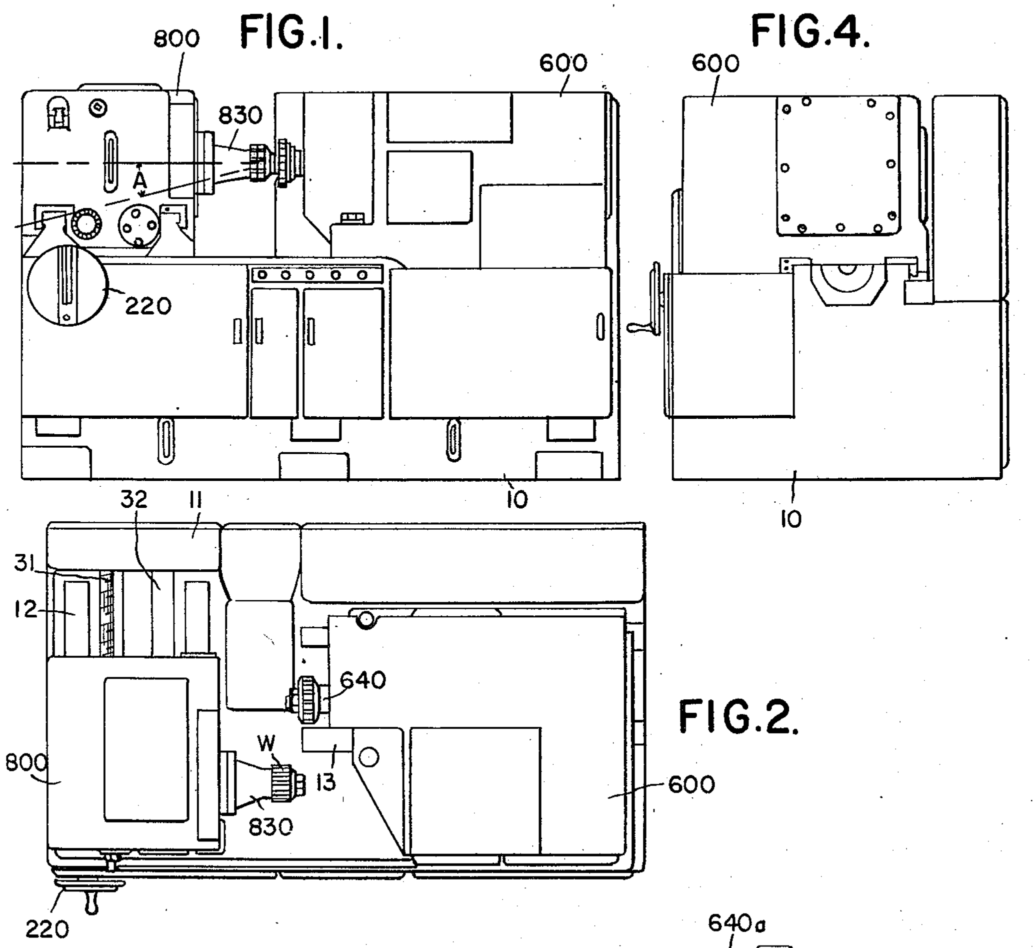
Figure 1 is a front elevation of the gear shaping machine.
Figure 2 is a plan view of the machine.
Figure 4 is an end view, looking to the left in Figure 1.
Figure 3:
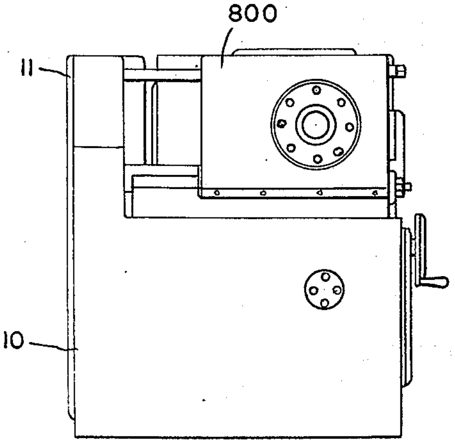
Figure 3 is an end view looking to the right in Figure 1.

Referring now to Figures 1 to 5, the general organization of the machine will be described. The machine comprises a base 10 on which are mounted a work head 800 and a cutter head 600. The cutter head 600 is mounted for adjustment along horizontal ways 13 and is adapted to be rigidly clamped in adjusted position. The work head 800 is mounted for movement along horizontal ways 12 and has means for effecting movement of the work head along such ways during the cutting operation, this movement constituting the in-feed between cutter and work. The work spindle 830 projects horizontally from the work head and is adapted to support one or a plurality of gear blanks W. The cutter spindle 640 projects from the cutter head 600 in a direction parallel to the axis of the work spindle 830.

A single drive motor is connected by trains of driving mechanism to the cutter spindle for reciprocating the same in its cutting stroke and for imparting index rotation or rotary feed thereto and for providing feeding movement to the work head along its ways 13 and for imparting index rotation or rotary feed to the work spindle 830. These means may provide for continuous or incremental in-feed and rotation, as will subsequently be described. In addition, rapid traverse means are preferably provided for effecting rapid movement of the work head from loading position to the start of cutting position and from final cutting position to loading position.

The base 10 is provided with an upstanding work head transmission housing 11 from which extend a work head feed screw 31 and a work head index drive shaft 32.

The cutter head 600 has a portion which extends below the upper surface of the base 10 and is there connected to the main drive shaft of the machine for imparting reciprocation to the cutter and to a second cutter rotary feed shaft.

Means are provided for effecting manual travel of the work head, this means comprising a hand wheel 220.

Figure 5:
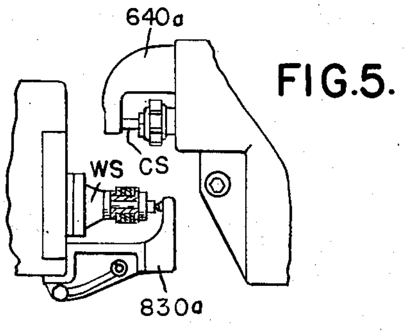
Figure 5 is a detail view showing outboard supports for work and tool spindles.

If desired, as best seen in Figure 5, both the cutter spindle 640 and the work spindle 830 may be provided with outboard supports 640*a* and 830*a*.

The means for imparting reciprocation to the cutter spindle 640 includes dynamic balancing means which render the machine substantially vibrationless in use and contribute to the speed and accuracy with which the gears may be cut.

The machine is designed primarily to be used with a flexible gear shaper cutter of the type disclosed in prior application, Serial No. 683,650, of Walter S. Praeg, Patent No. 2,604,016, granted July 22, 1952, which is assigned to the assignee herein. Inasmuch as this cutter is effective to provide clearance in back of the cutting edge by flexing of the cutter and since it therefore may operate to cut in both directions, the present machine is very substantially simplified over prior known gear shapers. It has been customary in the past to employ shaper cutters which are relieved in back of the cutting edge and which therefore are adapted to cut in only one direction. The conventional shaper cutter cycle therefore includes a cutting stroke, relieving movement, an idle return stroke, and a recovering movement corresponding to the relieving movement which completes the cycle and conditions the apparatus for a second cutting stroke. The present machine on the contrary has only two movements corresponding to the foregoing. These are a forward and return cutting stroke. In both cases of course index rotation or rotary feed is imparted to the gear and cutter. It will therefore be seen that the present apparatus is adapted to operate to remove metal at a substantially higher rate than has previously been possible, and furthermore due to the several refinements of the machine it operates quietly and will produce gears to a high degree of accuracy.

Contributing to the rigidity of the machine in operation and the accuracy of the gears produced thereby is the dynamic balancing mechanism for the cutter spindle previously referred to. Also contributing to this end are special means insuring absolute rigidity of the cutter head on the base during operation, this means including special means for effecting clamping of the cutter head to the base in such a manner as to prevent possibility of loss of rigidity.

The machine is futher designed so that the work head is supported on its ways 12 in such a manner as to take up the thrust of the cutter spindle in a most effective manner. The construction involves the location of supporting ways in a position such that the line joining the supporting ways makes a small angle A (Figure 1) with the axis of the work spindle. The other supporting ways are provided with holding-down means to prevent lifting of the work head from its ways during the operation.

BASE ASSEMBLY

The base assembly comprises a main casting 10 adjacent one corner of which is mounted an upwardly extending work transmission housing 11. At the upper surface of the casting 10 are provided ways 12 on which a work head 800 is mounted for longitudinal movement. Adjacent the other end of the machine and extending longitudinally thereof at substantially the longitudinal center line are ways 13 for mounting a cutter head 600. The ways 12 and 13 are disposed at right angles to each other and take care of the necessary relative motion between the cutter head 600 and the work head 800.

Figures 11, 12:
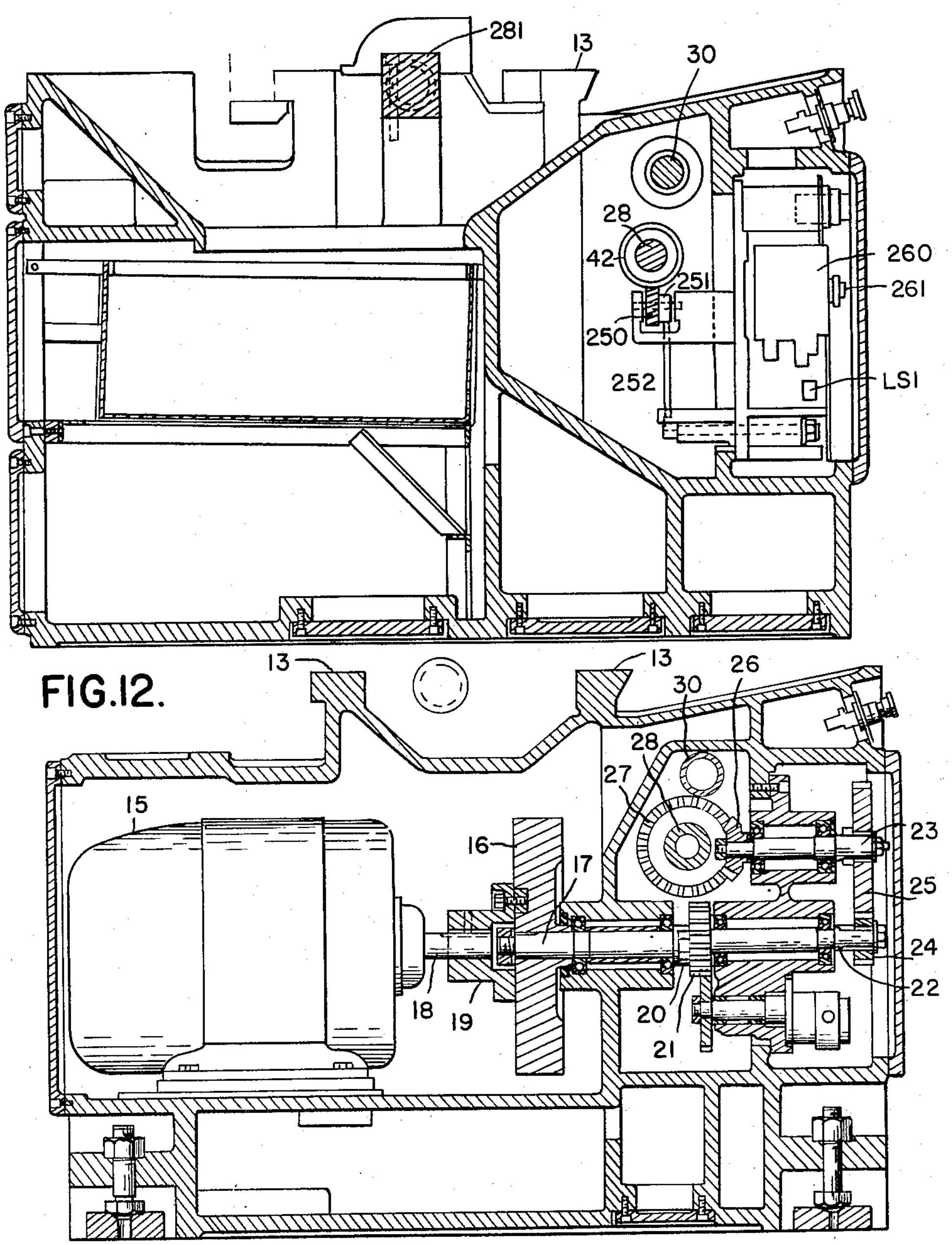
Figure 11 is a section on the line 11—11, Figure 6.
Figure 12 is a section on the line 12—12, Figure 6.

Mounted within the frame 10 is a main motor 15 which is well illustrated in Figure 11. A flywheel 16 is keyed or otherwise secured to a shaft 17 and the motor shaft 18 is coupled to the flywheel through a flexible coupling 19. At the forward end of the shaft 17 is a small pinion 20 which meshes with a gear 21 carried by a shaft 22, which shaft is coupled to a shaft 23 by change gears 24 and 25. At the inner end of the shaft 23 is a bevel pinion 26 meshing with a bevel gear 27 keyed or otherwise secured to the main shaft 28 of the machine.

The main shaft 28 runs longitudinally of the machine and to it are connected several different trains of driving mechanisms which will be separately described.

Figures 10, 23:
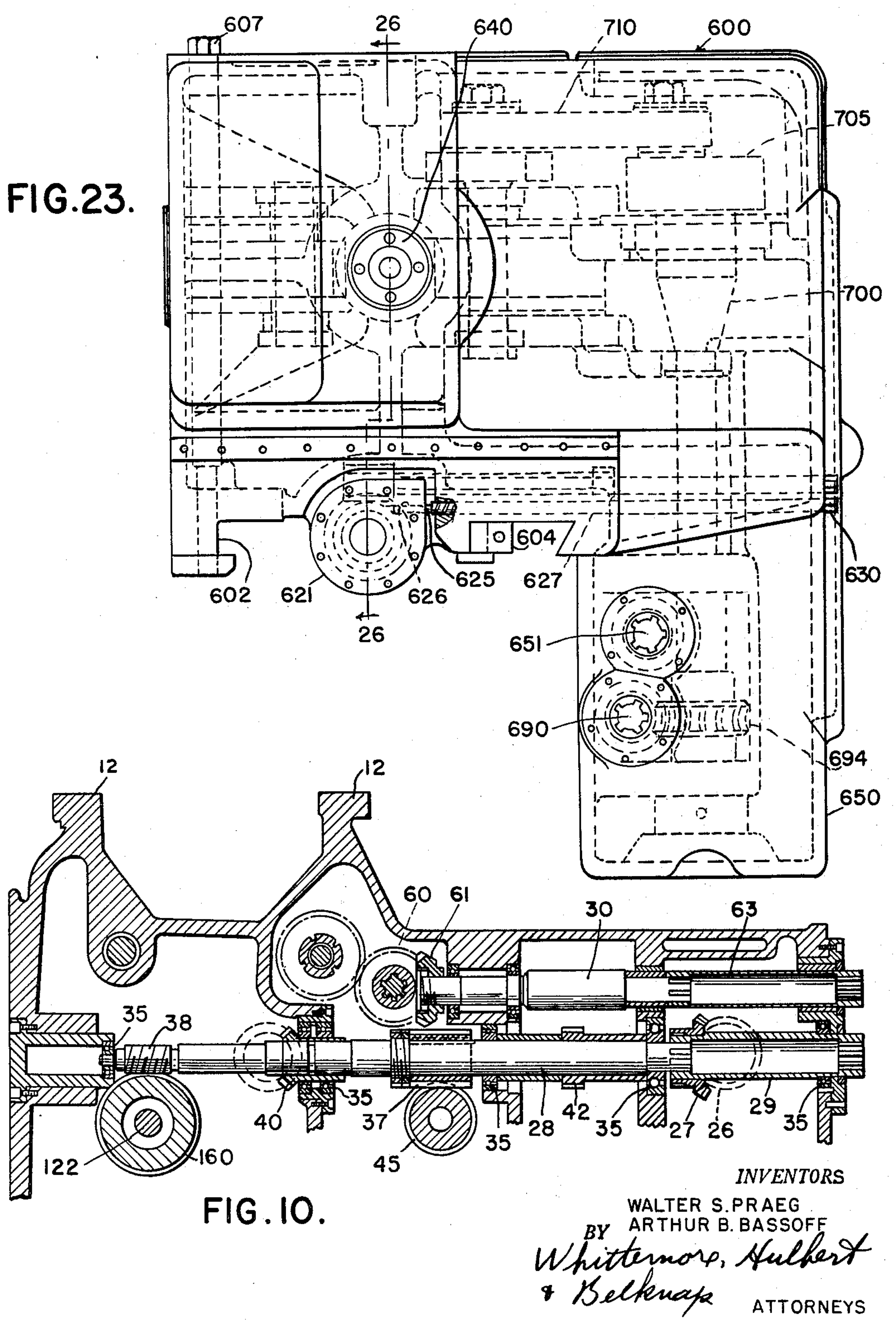
Figure 10 is a section on the line 10—10, Figure 9.
Figure 23 is a left side elevation of the cutter head.

The cutter head 600, as best see in Figures 21 and 23 and as will subsequently be described, has a downwardly extending portion adapted to be received within the base 10 below the plane of its upper surface and is further provided with means for connecting with two operating shafts in the base. The right-hand end of the main shaft 28 as best seen in Figure 10 connects to the cutter drive shaft through the medium of a splined connecting sleeve 29. A cutter rotary feed drive shaft 30 is parallel to main drive shaft 28 and has a splined connection with the rotary feed mechanism carried in the adjustable cutter head 600.

Figure 6:
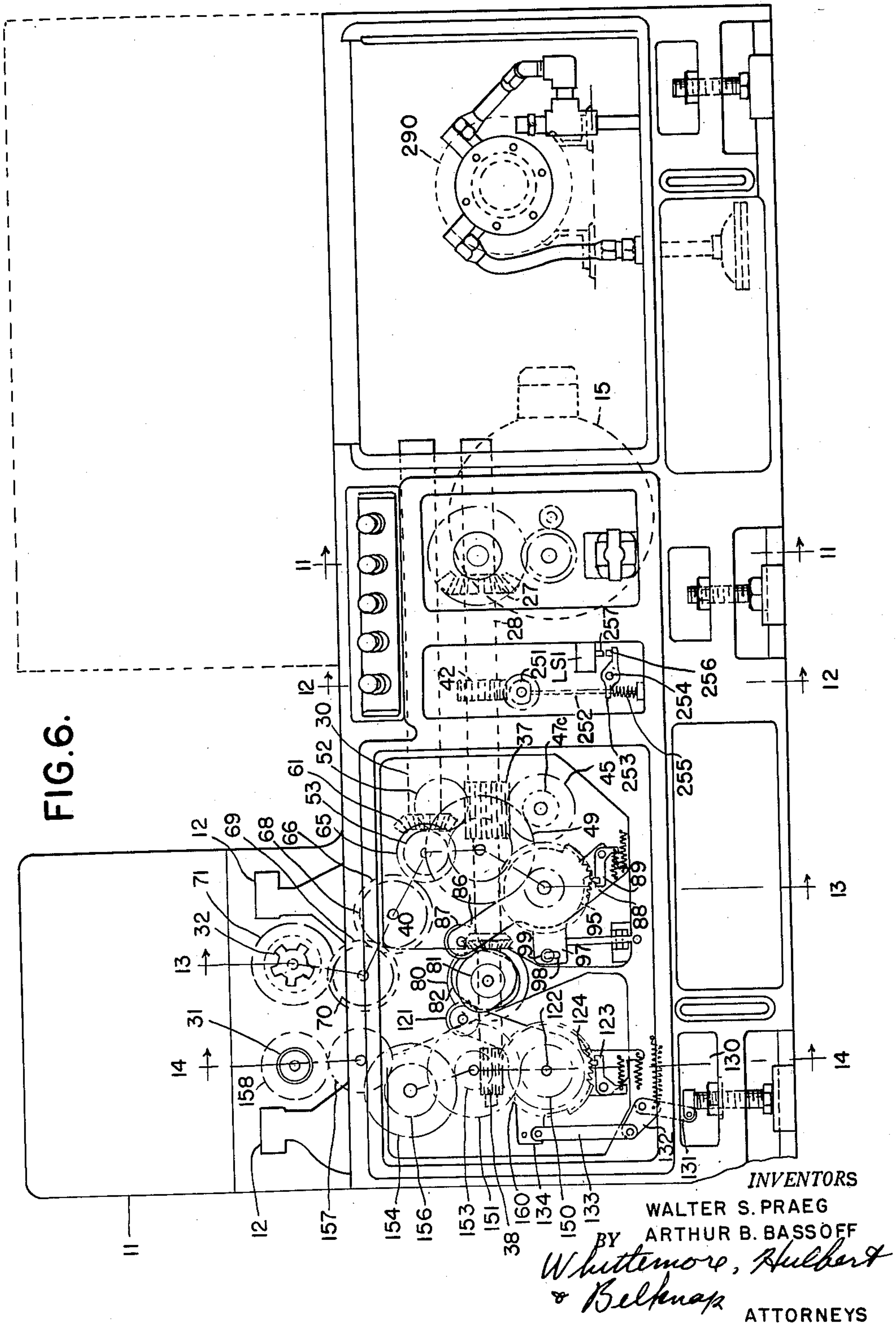
Figure 6 is an enlarged front elevation of the machine base.

The work head 800 has means subsequently to be described for connection with two operating shafts extending from the work head transmission housing 11. One of these is the work head feed screw 31 and the other is the work head rotary feed drive shaft 32, both seen in Figures 6 and 7.

In the automatic operation of the machine means are provided for effecting the desired rotation of the four shafts referred to and further means are provided so that some of the shafts may be operated continuously or intermittently so as to provide continuous or incremental in-feed and continuous or incremental rotary feed.

Referring to Figure 10, the main shaft 28 is mounted in suitable bearings indicated generally at 35. Keyed or otherwise secured to the shaft 28 is a worm 37 which may be considered as the starting point of the train of driving mechanism for effecting rotary feed of the gear and cutter. Adjacent the rear end of the cutter spindle 28 is a second worm 38 which may be considered as the starting point of the train of mechanism for effecting continuous in-feed of the work head. The main shaft 28 also carries a bevel gear 40 which may be considered as the starting point of a train of mechanism for effecting both incremental rotary feed and in-feed. The main shaft 28 is also provided with a worm 42 connected to a train of mechanism for timing the operation of the machine.

The several trains of mechanism referred to will be separately described.

*Rotary feed*

Figures 13, 13A, 13B:
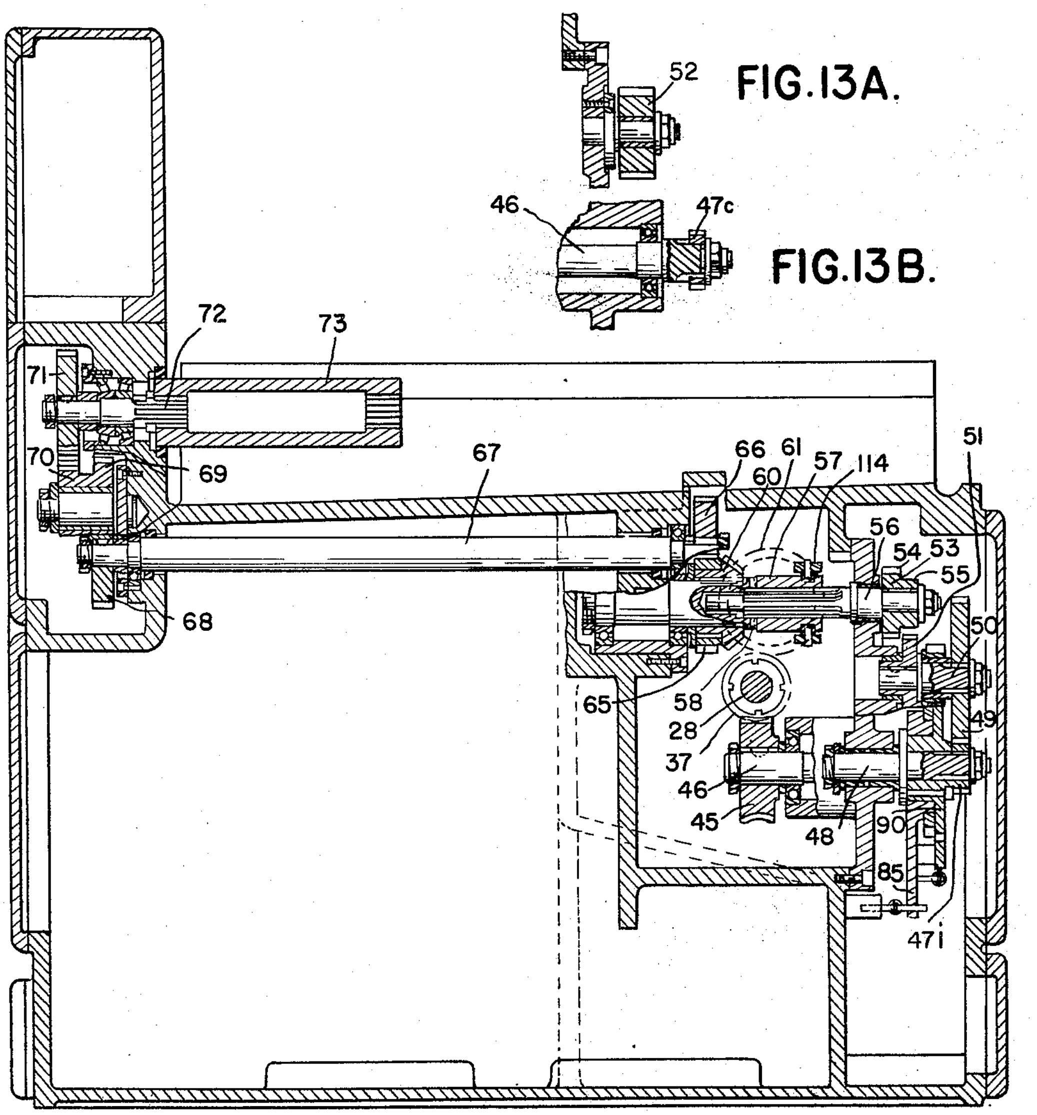
Figure 13 is a section on the line 13—13, Figure 6.
Figure 13A is a fragmentary section showing an idler gear which may be used with gears seen in Figure 13.
Figure 13B is a fragmentary section showing a gear in a different operative train from that shown in Figure 13.
Figure 20:
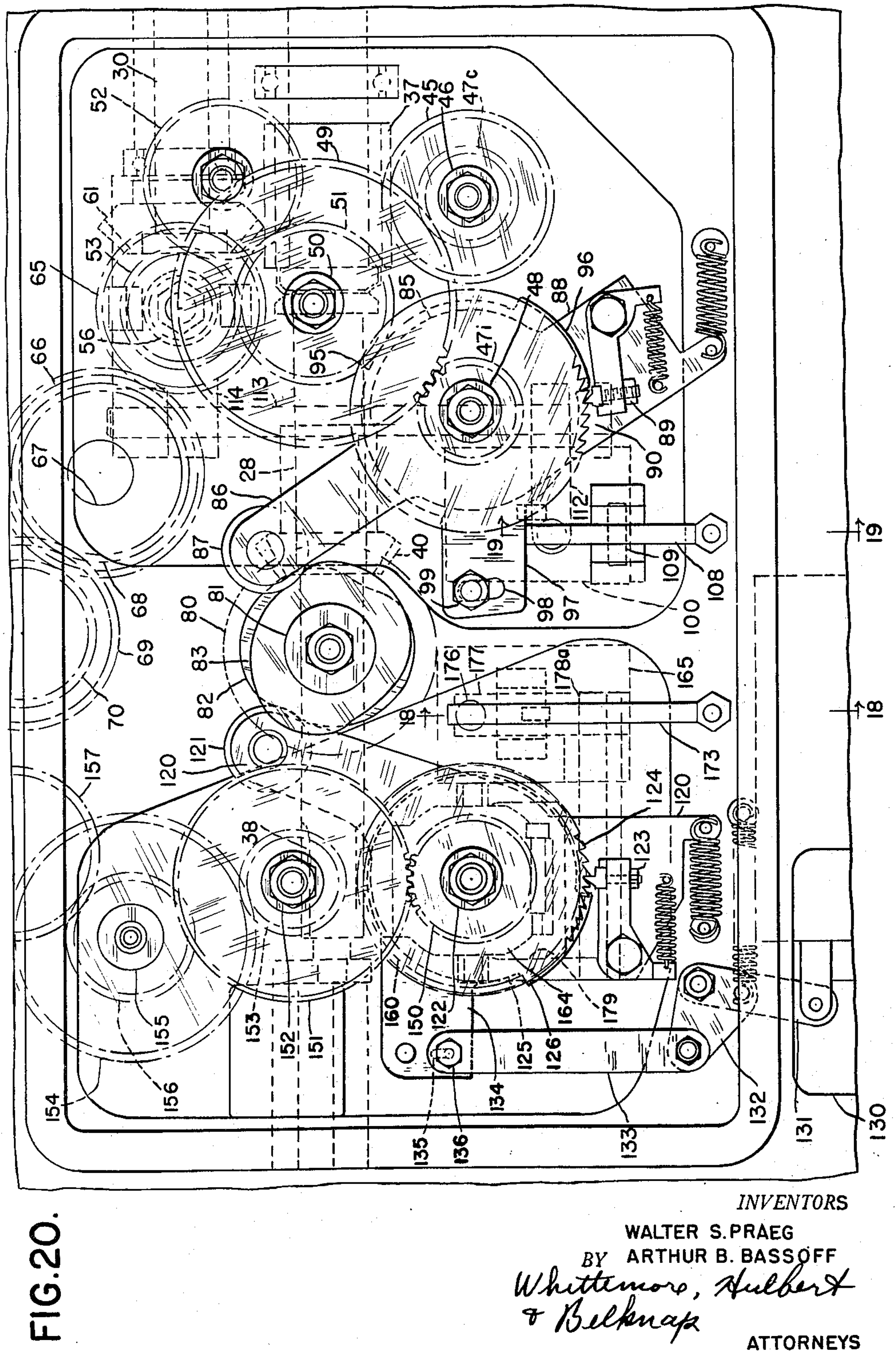
Figure 20 is an enlarged partial front elevation of the base, with the cover plate removed.

Considering first the mechanism for effecting continuous rotary feed of the gear and cutter, reference is made to Figures 20 and 13. The worm 37 meshes with a worm gear 45 mounted on a shaft 46. If the machine is to be operated so as to have continuous index rotation of the work and cutter, a pinion 47c is mounted on the shaft 46 in the position shown in Figure 20. The pinion 47c may if incremental rotation is to be employed be removed from the shaft 46 and mounted instead upon a shaft 48 in the position designated 47i in this figure. However, in the present instance the pinion 47c is considered as meshing with a gear 49 mounted on a shaft 50, which shaft carries a second gear 51. The gear 51 may mesh with an idler gear 52 or it may mesh directly with a driven gear 53 depending upon the arrangement of the gears. For an understanding of this mechanism reference is made to Figures 13 and 13A. The gear 53 has teeth 54 at one end only, the other end of the gear being reduced as indicated at 55. If the gear is located on the shaft 56 with the toothed end to the left as seen in Figure 13 the gear 51 does not mesh with the teeth 54 and the driving connection between the gears 51 and 53 is through the relatively wide idler gear 52. If it is desired to reverse the direction of rotary feed the idler gear 52 is removed, and the gear 53 is reversed so that its teeth 54 are in the plane of and mesh with the teeth of the gear 51. This arrangement is provided so that the direction of rotation of the work gear and cutter may be as desired.

The shaft 56 at its rear end has a splined clutch sleeve 57 having clutch teeth 58 at its rear end engageable with similar teeth formed on a bevel gear clutch element 60 mounted for rotation on the rear end of the shaft 56. When the clutch elements 57 and 60 are engaged rotation is imparted to the clutch element 60. Clutch element 60 includes bevel gear teeth meshing with a bevel gear 61 carried by the cutter timing shaft 30 (Figure 10). The shaft 30 is adapted to be coupled to a shaft carried by the cutter head 600 through the medium of a splined coupling sleeve 63. Secured to the bevel gear 60 is a pinion 65 (Figure 13) which meshes with a gear 66 keyed or otherwise secured to a work head time shaft 67, to the opposite end of which is connected a gear 68 which meshes with a gear 69 integrally formed with a second gear 70 which drives a gear 71 keyed or otherwise secured to a short spline shaft 72. The shaft 72 is adapted to be connected to the work head worm drive shaft by a splined coupling sleeve 73.

From the foregoing description it will be apparent that as long as the main motor 15 is running and the pinion is in the position of 47c in Figure 20, continuous timed rotation will be imparted to both the cutter spindle and the work spindle if clutch 60 is engaged. In some cases, however, it is preferable to provide for incremental rotation of these spindles. For this purpose pinion 47c is removed from the shaft 46, thus breaking the train of gears previously described, and is placed on the spindle 48 in the position indicated at 47i in Figures 20 and 13 in mesh with the gear 49 previously described. Accordingly, any rotation of the pinion 47i in its illustrated position will be effective to rotate the work head worm shaft driver 73 and the shaft 30 which imparts rotary feed to the cutter.

Figure 7:
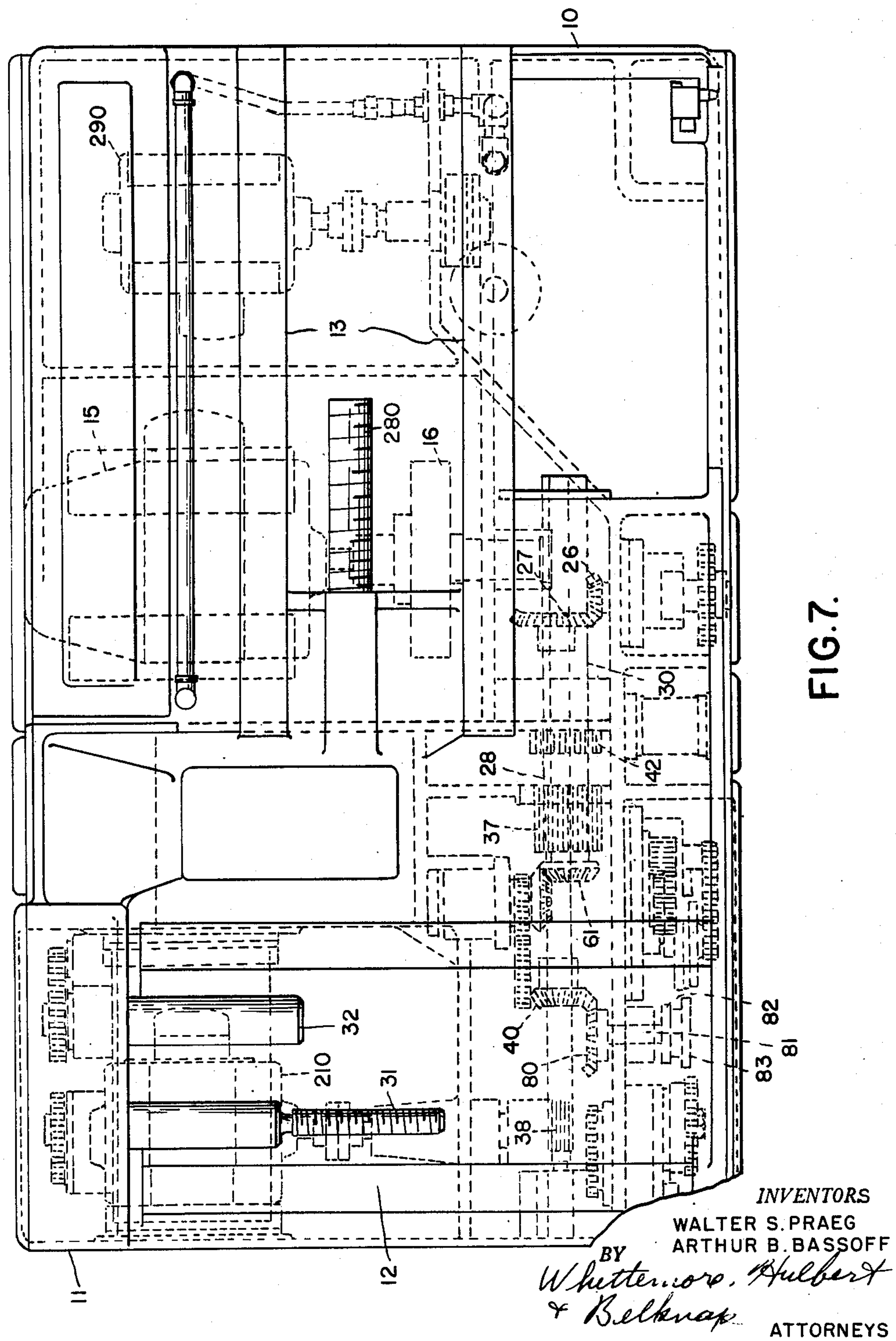
Figure 7 is an enlarged plan view of the base.

Mechanism for effecting intermittent rotation of the pinion in its position 47i will now be described. The beveled pinion 40 carried by the main shaft 28 meshes with a bevel gear 80 mounted on a shaft 81 which carries a pair of cams 82 and 83 (Figures 7 and 20). The cams 82 and 83 respectively impart intermittent or incremental in-feed to the work head and intermittent or incremental rotary feed to the cutter and gear spindles.

Referring again to Figure 20, a lever 85 mounted for rotation on the shaft 48 has a first arm 86 carrying a roller 87 which rides on the periphery of the cam 83. The lever 85 has a second arm 88 to which is pivoted a spring pressed pawl 89 adapted to have one way engagement with ratchet teeth formed on the periphery of a ratchet wheel 90 keyed or otherwise secured to the shaft 48.

Also pivoted to the shaft 48 is a blanking or masking plate 95 having a masking portion 96 adapted to overlie some of the ratchet teeth in the zone of operation of the pawl 89. The masking plate is connected to an adjusting arm 97 having an elongated slot 98 formed therein through which a fastening screw 99 extends. By loosening the screw 99 and effecting adjustment of the masking plate, the desired number of ratchet teeth may be exposed for actuation by the pawl 89.

The masking plate 95 may be adjusted so that any predetermined number up to four pawl teeth may be exposed for engagement by the ratchet 89 and will of course be clamped in adjusted position by tightening the screw 99. By this means it is possible to vary the rate of rotary or circular incremental feed. Accordingly, it is possible to take advantage of a relatively high rate if the material and characteristics of the gear permit. On the other hand, by setting the masking plate so as to expose a single ratchet tooth, a very fine feed with corresponding improvement in surface finish may be produced.

In like manner the masking plate 125 (later to be described in connection with infeed) may also be adjusted so that actuation of the pawl 123 may advance the ratchet disc by a number of teeth which can be predetermined from 1–4.

Figure 19:
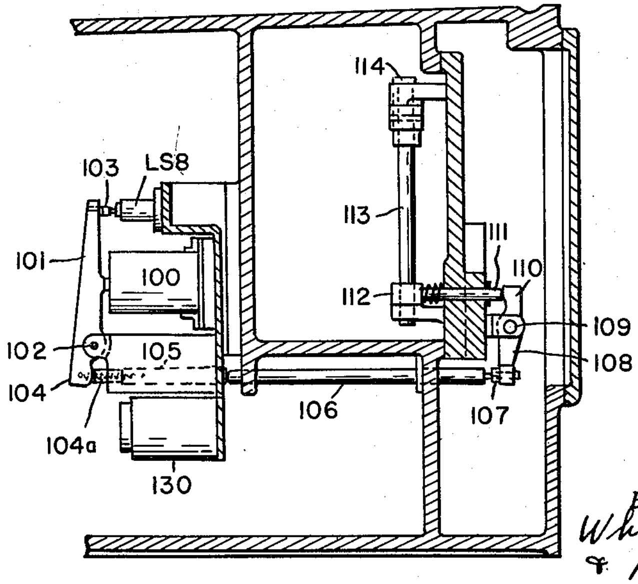
Figure 19 is a section on the line 19—19, Figure 20.

Automatic means are provided for operating the clutch sleeve 57 to connect and disconnect the spindle rotating mechanism including sleeve 73 to power. This means takes the form of a solenoid 100 (Figure 19). The solenoid is of the push type and its core engages a lever 101 pivoted as indicated at 102 to the base of the machine. The upper end of the lever 101 is provided with an adjustable screw 103 adapted to engage the actuator of a limit switch LS8. The lower end of the lever 101 is rounded as indicated at 104 and engages one end of a rod 105 which in turn engages a push rod 106. A light spring 104*a* connects the lower end of lever 101 to the support for solenoid 100, so as to prevent the possibility of the lever 101 giving a false signal to the limit switch LS8 upon de-energization of solenoid 100, as might otherwise occur prior to the return of push rod 105. The opposite end of push rod 106 engages an adjustable abutment 107 carried by one end of a lever 108 pivoted as indicated at 109 and spring biased to urge lever 101 into engagement with the solenoid 100. The upper end of the lever 108 is rounded as indicated at 109 and spring biased to urge lever 101 into engagement with the solenoid 100. The upper end of the lever 108 is rounded as indicated at 110 and engages a short push rod 111 which engages an arm 112 extending from a vertical shaft 113. The upper end of the shaft 113 is connected to a yoke 114 (see also Figure 13) which is connected to clutch 57 for engaging and disengaging the clutch. When solenoid 100 is energized, the clutch is disengaged.

Thus it will be seen that either incremental or continuous rotary feed of both tool and work gear may be selected by positioning gear 47 in position 47*i* or 47*c* respectively. Further, rotary feed may be suspended at will by energizing solenoid 100, to disengage the clutch which comprises toothed elements 57 and 59.

*In-feed*

Figures 14, 15, 16, 17:
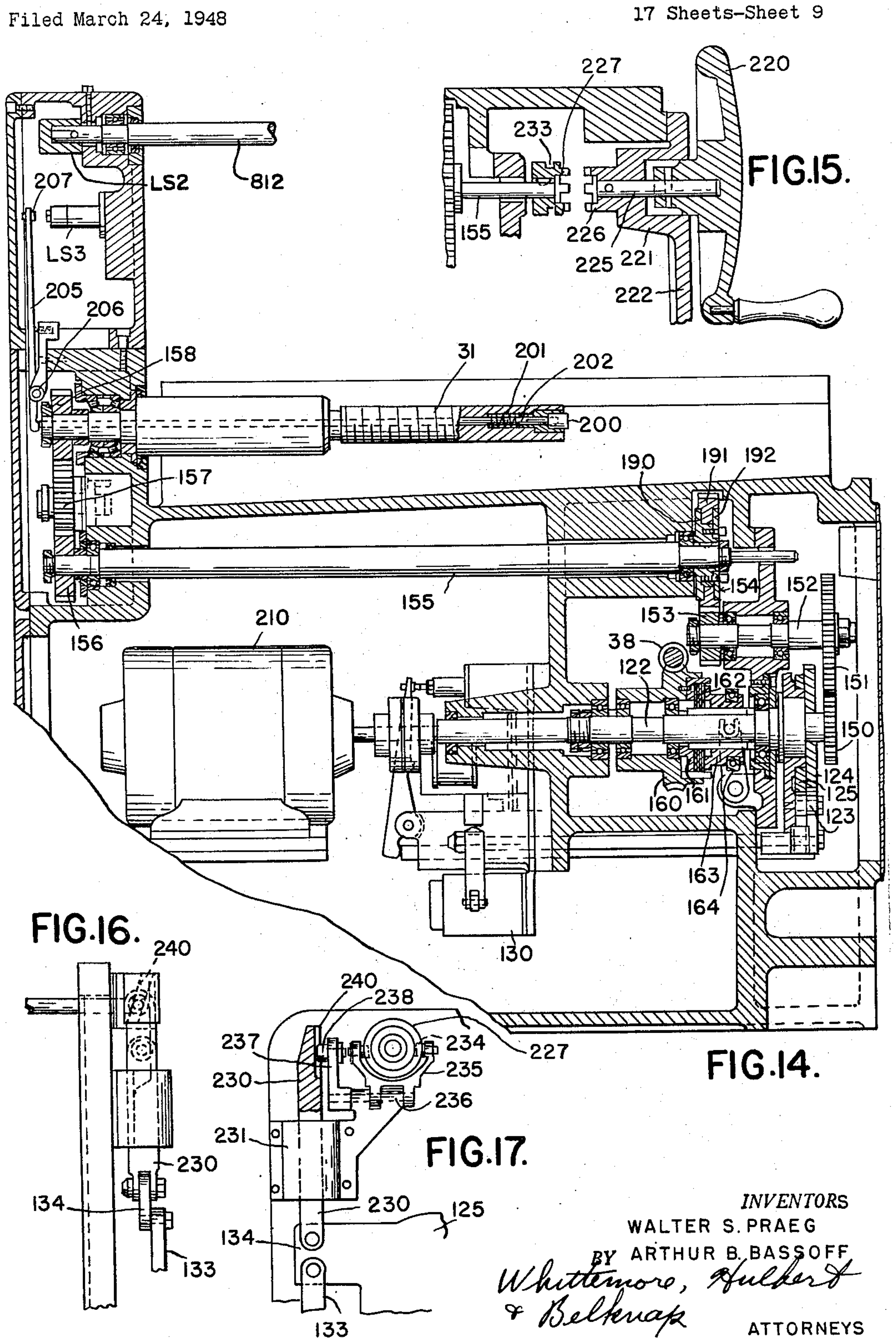
Figure 14 is a section on the line 14—14, Figure 6.
Figure 15 is a sectional view illustrating a manual feed device which may be used with the structure shown in Figure 14.
Figure 16 is a fragmentary elevation of a clutch actuator used in conjunction with the manual feed shown in Figure 15.
Figure 17 is a front elevation of the structure of Figure 16, with parts broken away.

Mechanism is provided for effecting incremental or continuous in-feed of the work head, best seen in Figures 14 and 20.

This means takes the form of a lever 120 carrying the roller 121 engaging a cam 82 so that during rotation of the cam 82 back and forth oscillation is imparted to the lever 120. The lever 120 is pivoted to a shaft 122 and carries a spring biased pawl 123 adapted to engage the teeth of a ratchet disk 124 mounted on the shaft 122.

Loosely mounted on the shaft 122 is a blanking or masking plate 125 having a masking portion 126 adapted to overlie the teeth of the ratchet in the vicinity of the pawl 123. Means are provided for moving the masking plate into position to render the pawl mechanism ineffective and this means takes the form of a solenoid 130 (Fig. 20) adapted to rock connected levers 131 and 132. Lever 132 is connected by a link 133 to arm 134 of the blanking disk which is effective to rotate the blanking disk upon energization of the solenoid 130.

Preferably, means are provided for adjusting the position of the masking plate 125 in its retracted position so that it will expose a predetermined number of ratchet teeth of the disk 124 for actuation by the pawl 123. The mechanism is so designed that the cam moves the pawl relative to the ratchet disk by an amount corresponding to a plurality of teeth. In the present instance the parts are so designed that the maximum rotation of the ratchet disks per stroke of the pawl is four teeth. Suitable means such for example as an elongated slot 135 in the arm 134 is provided to effect adjustment of the masking plate in its inoperative position. The connecting bolt 136 may be adjusted in the slot 135 to expose the desired number of teeth and may thereafter be clamped in adjusting position with a clamping nut (not shown). The link 133 in this case will of course be pivoted to an enlarged portion on the bolt 136 so as to retain its pivot connection after the bolt 135 has been tightened in adjusted position on the arm 134.

Rotation of the ratchet disk 124 imparts intermittent rotation to a pinion 150 which drives a gear 151 keyed or otherwise secured to a shaft 152. At the rear end of the shaft 152 is a driving pinion 153 meshing with a friction type gear indicated generally at 154 which is keyed or otherwise secured to a shaft 155. The shaft 155 at its rear end has a pinion 156 which meshes with a gear 157 which in turn drives a gear 158 keyed or otherwise secured to the work head feed screw 31 (Fig. 14). Limit switch LS6 (Fig. 8) is actuated by actuation of solenoid 130.

When it is desired to obtain continuous in-feed of the work head the solenoid 130 is de-energized so as to interpose the masking portion 126 of the mask between the pawl 123 and the teeth of the ratchet disk 124. At this time feed of the work head is accomplished from the constant in-feed worm 38 which meshes with a constant in-feed worm gear 160. The worm gear 160 is formed on a clutch housing 161 (Fig. 14) containing a clutch of the friction plate type, the plates being indicated at 162. A pressure ring 163 is associated with the clutch housing and includes an actuating yoke 164 by means of which the clutch may be engaged and disengaged.

Figures 8, 18:
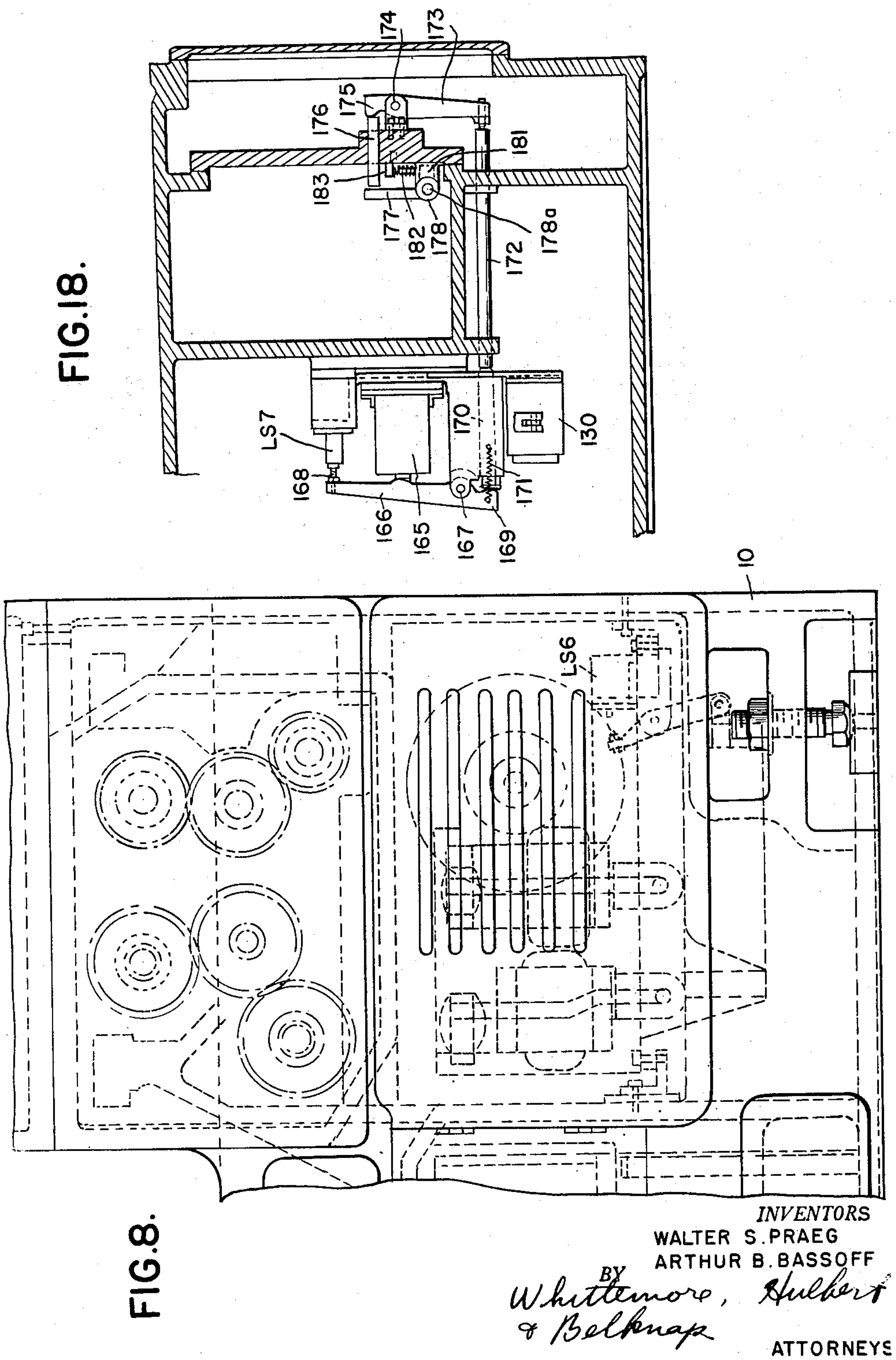
Figure 8 is an enlarged fragmentary rear elevation of the base.
Figure 18 is a section on the line 18—18, Figure 20.

The mechanism for operating the clutch is illustrated in Figures 18 and 14. A solenoid 165 is mounted on the base and is adapted to engage a lever 166 which is pivoted as indicated at 167. The upper end of the lever 166 has an adjustable abutment 168 adapted to engage the actuator of a limit switch LS7. The lower end of the lever 166 has a rounded portion as indicated at 169 which engages the end of a push rod 170. A light spring 171 connects the lower end of the lever 166 to the support for the solenoid 165 so as to prevent the possibility of the lever 166 giving a false signal to the limit switch LS7 upon de-energization of solenoid 165, as might otherwise occur prior to return of push rod 170. The push rod 170 engages a second push rod 172 which in turn engages the lower end of a lever 173 pivoted as indicated at 174. The upper end of the lever 173 is rounded as indicated at 175 and engages a short push rod 176, the opposite end of which engages a lever 177 extending from a sleeve 178 on shaft 178*a* to which are connected yoke arms 179 engaging the yoke 164 in which the pressure ring 163 of the clutch is rotatable. The sleeve 178 is provided with a short inwardly extending arm 181 which engages one end of a compression spring 182, the other end being seated against a spring seat element 183. The spring 182 biases the various parts and holds the lever 166 against the push solenoid 165. When the solenoid is energized the lever 166 is swung outwardly about its pivot 167 and the yoke supporting sleeve 178 is rotated so as to cause engagement of the clutch.

At this time, therefore, the work head feed screw is rotated through the worm 38, the worm gear 160, and the clutch including the pressure ring 163 which is keyed or otherwise secured to the shaft 122 which carries the pinion 150. The pinion 150 is in the train of operating mechanism previously described in conjunction with the means for providing incremental in-feed and the balance of this train of mechanism is employed in imparting continuous in-feed to the work head.

Reference was previously made to the provision of a friction slip gear at 154 in the train of operating mechanism which imparts rotation to the work head feed screw. As best seen in Figure 14, this gear comprises a hub portion 190 keyed or otherwise secured to shaft 155. Mounted on the hub 190 is a toothed portion 191, retained in place on the hub by means of an annular friction element 192. Parts are arranged so that when a predetermined torque is applied to the friction slip gear, slippage occurs between the hub 190 and the toothed portion 191.

The purpose of the friction slip gear 154 is to permit accuracy in location of the work head during the final cutting operation of the gear. For this purpose the work head feed screw 31, which is received within a stationary feed nut carried by the work head (later to be described) is provided with a forwardly extending movable in-feed controlling portion 200 which is adapted to engage an adjustable abutment carried by the work head. This abutment is accurately adjusted to a predetermined position and limits relative in-feed between the cutter and work.

The work head feed screw 31, including the in-feed controlling portion 200, is provided with a longitudinal bore 201 which receives a push rod 202. The push rod 202 at its inner end carries the portion 200 which engages the adjustable abutment in the work head and causes the push rod 202 to move to the left as seen in this figure. The outer end of the push rod engages a lever 205 which is pivoted as indicated at 206 and which at its upper end carries an adjustable screw 207 adapted to engage a limit switch LS3.

A rapid traverse motor 210 is connected to the shaft 122 and when the portion 200 of the work head feed screw 31 engages the adjustable abutment carried by the work head, actuation of the limit switch LS3 energizes the rapid traverse motor 210. This motor is of the torque type and its torque is effective to hold the end of feed screw 31 firmly against the adjustable abutment, thereby insuring positive location of the work head in the desired position for the final cutting operation. In the event that in-feed of the work has been incremental, this same mechanism insures positive positioning of the work in accurately predetermined position for final cutting irrespective of whether or not the last increment of feed has positioned the work in exactly predetermined final cutting position. Limit switch LS3 also interrupts feeding movement of the work head by de-energizing solenoid 130 to mask pawl 123 if feed is incremental, or by deenergizing solenoid 165 to release clutch plates 162 if feed is continuous.

Manual means may if desired be provided for effecting in-and-out movement of the work head. This mechanism is illustrated in Figures 15, 16 and 17, which it will be understood represents a modification to be applied to the construction illustrated in Figure 14. In this case the hand wheel 220 is mounted in a boss 221 formed in a removable cover plate 222, the hand wheel being mounted for rotation and for limited axial movement. The hand wheel has keyed or otherwise secured thereto a short shaft 225 which at its inner end carries a toothed clutch element 226. In this case the forward end of the work head feed shaft 155 is provided with a mating clutch element 227 keyed thereto against rotation but mounted for slight axial movement with respect thereto.

Referring now to Figures 16 and 17, a cam bar 230 is connected to the arm 134 of the blanking disk 125 and is guided for vertical movement in a bracket 231. The clutch element 227 is provided with a peripheral groove 233 which receives rollers 234 carried at the ends of the arms of a yoke 235. The yoke 235 is secured to a pivot shaft 236, the opposite end of which carries a lever 237. The cam bar 230 is provided with an inclined slot 240 and the lever 237 has a roller 238 movable in the cam slot. When the solenoid 130 operates to interpose the blanking portion 126 between the pawl 123 and the teeth of ratchet 124, this motion is transmitted to the cam bar 230 and results in movement of the clutch element 227 toward the cooperating clutch element 226. This positions the clutch element 227 in position to be engaged by the clutch element 226 when the hand wheel 220 is moved inwardly to its full extent of movement. This permits efficient meshing of the teeth of the clutch elements 226 and 227 and conditions the parts for manual adjustment of the work head by rotation of the hand wheel 220.

Inasmuch as the machine is designed for use with a flexible cutter which may cut in both directions, incremental in-feed and rotary feed will normally take place at the end of each stroke of the cutter spindle. However, if the machine is employed in cutting shoulder gears so that sufficient clearance does not exist for the cutter to pass completely through the gear being cut, it may be necessary to limit incremental feed to one end of the stroke only, namely prior to a cutting stroke which in this case will be followed by an idle return stroke. This is accomplished by providing the cams 82 and 83 with single lobes. On the other hand, if incremental feed is to take place at both ends of the stroke then each of the cams 82 and 83 will be provided with a pair of lobes 180° apart.

*Timing mechanism*

The machine is automatic in its operation and included in the mechanism for carrying out automatic operation is a worm 42 for operating the timing mechanism. This mechanism is illustrated in Figure 12 and includes a worm gear 250 cooperating with the worm 42 and provided with a hub 251 having a flattened portion to operate as a cam. Engaging the flattened portion of the hub 251 is a pin 252, the lower end of which engages a lever 253 (Fig. 6) which is pivoted at 254 and is biased against downward movement of the pin 252 by a compression spring 255. A second lever arm 256 engages a pin 257 which actuates a limit switch LS1 which is connected to a counter 260 (Fig. 12). Each rotation of the worm gear 250 therefore results in an impulse of the counter which may be pre-set by means of a knob 261 for the desired cycle. When the counter has received the number of impulses to which it is set it is adapted to stop motor 15 and to reverse and initiate reverse rapid traverse by the rapid traverse motor 210.

Figure 9:
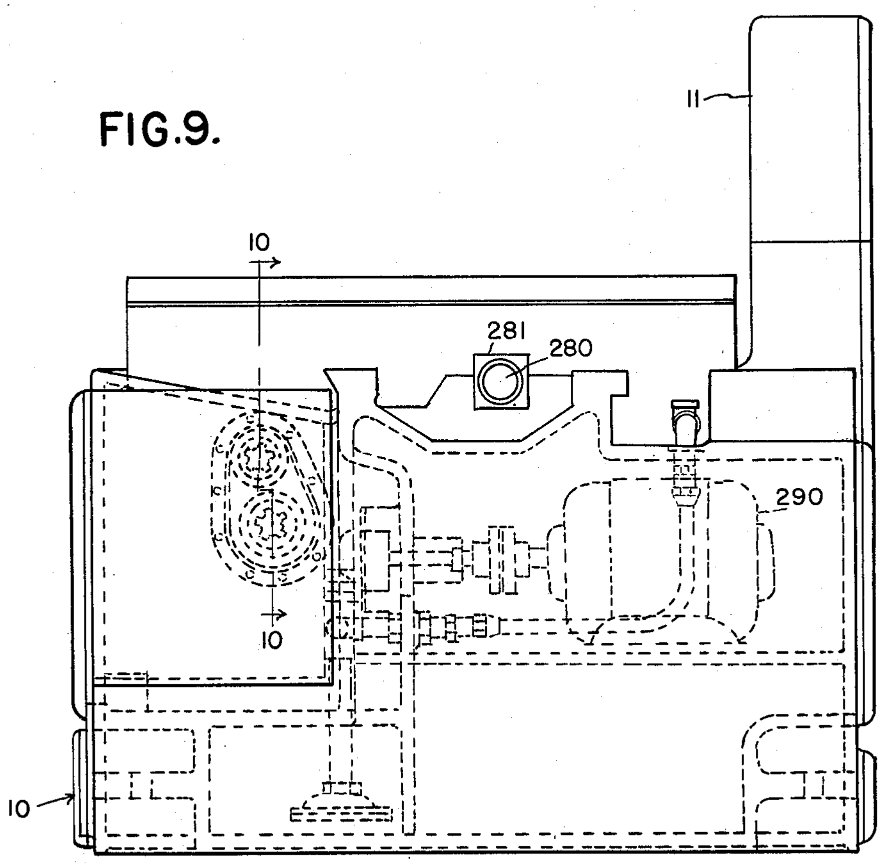
Figure 9 is an enlarged right side elevation of the base.

Means for adjusting the cutter along the ways 13 include a cutter adjusting screw 280 (Figures 9 and 12) rigidly secured to the base 10 by a cutter adjusting screw supporting block 281. The cutter head, as will subsequently be described, has a rotatable adjusting nut carried thereby which threadedly engages the screw 280, and means are provided for effecting rotation of the nut with consequent longitudinal movement of the cutter head along the ways 13.

A separate coolant motor 290 is connected to a pump for supplying coolant for the cutting operation.

CUTTER HEAD

The cutter head is illustrated in Figures 21–31. As previously described in general terms, the cutter head is mounted on the base 10 and is adjustable thereon along ways 13 which extend at right angles to the ways 12 carrying the work head. In the operation of the machine the cutter head is manually adjusted to its operating position and is thereafter rigidly locked in position. The cutter head carries a cutter spindle which is mounted for cutting reciprocation and which is guided in the cutter head for rotary feed.

The cutter head comprises a main frame or casting 600 having guiding surfaces 601 and 602 adapted to slidably engage the ways 13 formed on the upper surface of the base. The head has an inclined surface 603 for engaging a correspondingly shaped portion of the ways 13 and associated with the inclined surface 603 are a pair of tapered adjusting gibs 604 adapted to be adjusted longitudinally of the ways by clamping screws 605 or the like. Adjustment of the gibs 604 in a direction parallel to the ways exerts a clamping action on the ways and rigidly locks the cutter head in desired position. The other surface 602 has a holding-down strip 606 associated therewith, the strip being secured to the cutter head 600 by through bolts 607.

Figures 24, 27:
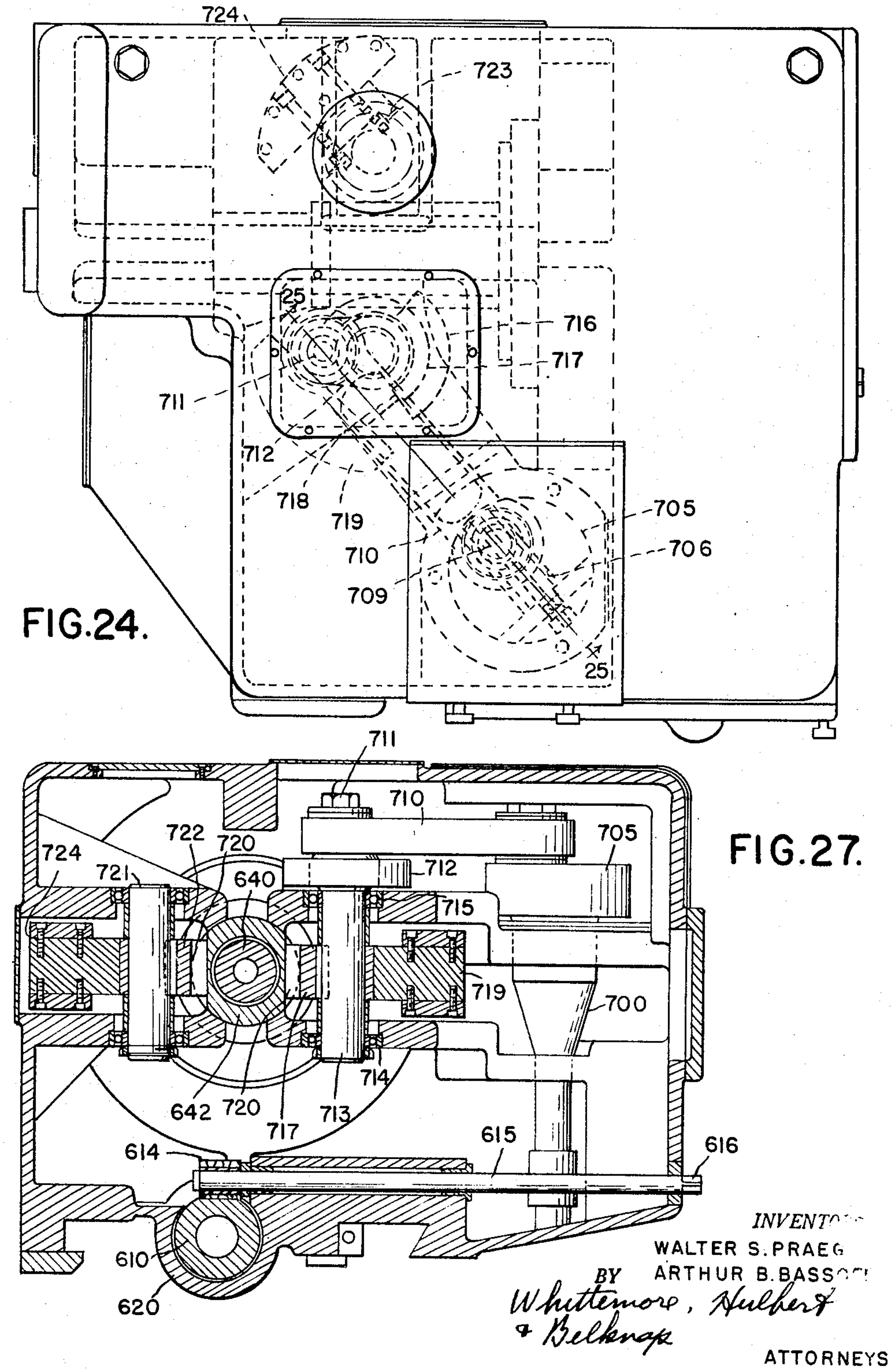
Figure 24 is a plan view of the cutter head.
Figure 27 is a section on the line 27—27, Figure 21.
Figures 26, 28, 30, 31:
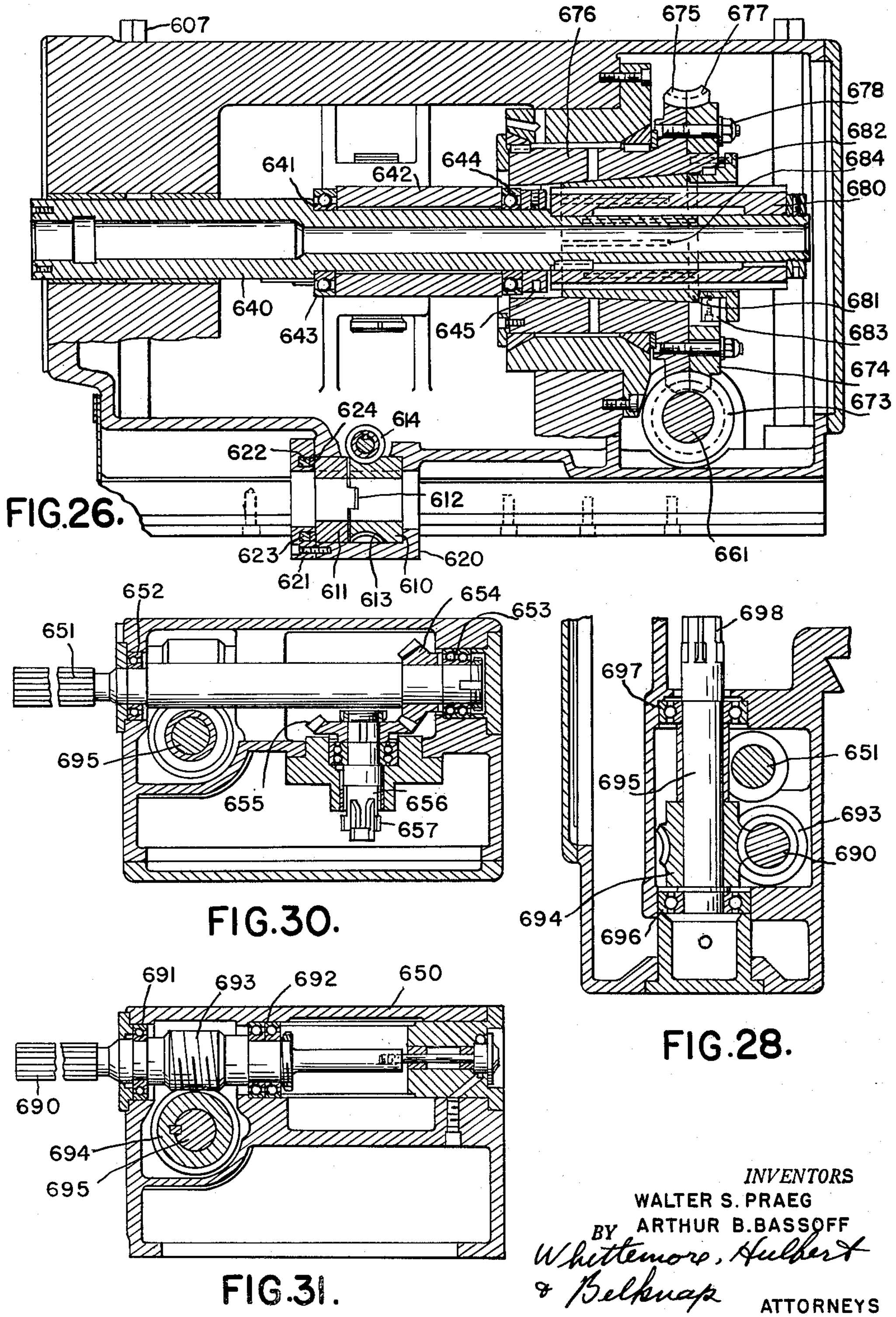
Figure 26 is a section on the line 26—26, Figure 23.
Figure 28 is a section on the line 28—28, Figure 21.
Figure 30 is a section on the line 30—30, Figure 21.
Figure 31 is a section on the line 31—31, Figure 21.

In order to effect the desired accurate adjustment of the cutter head 600 on the base 10, the mechanism best illustrated in Figures 26 and 27 is employed. This mechanism comprises a double nut composed of the internally threaded members 610 and 611. These elements are provided with interfitting ears and recesses indicated at 612 to insure simultaneous rotation of the elements while permitting limited relative axial movement. The element 610 is provided with teeth 613 adapted to mesh with the teeth of a worm 614 mounted on a manually operated shaft 615, the end of which extends outwardly from the cutter head and is squared as indicated at 616 for the reception of the operating hand tool. The feed nut composed of the elements 610 and 611 is rotatably mounted in a depending housing portion 620 which is apertured for the reception of the horizontally extending, rigidly mounted cutter adjusting screw 280 which is carried by the base. The housing 620 is closed by an annular cover plate 621.

Means are provided for locking the cutter head in its adjusted position independently of the gib clamping means previously described. This means is provided by an annular recess 622 (Figure 26) formed in the cover plate 621 which receives an annular rubber washer 623. An annular metal ring 624 is provided in the recess outwardly from the rubber washer 623 and engages one end of the internally threaded nut element 611. As best seen in Figure 23, the closure plate 621 is provided with an opening 625 into which extends a plunger 626. A manually rotatable shaft 627 engages the plunger 626 and has screw threaded engagement with the cutter head frame 600. The outer end of the operating shaft 627 is squared as indicated at 630 for the reception of a hand tool. When the cutter head has been adjusted to desired position the shaft 627 is rotated in a direction to force the plunger 626 into the annular space containing the rubber ring 623. As is well-known, rubber is resilient and elastic but is substantially incompressible. Accordingly, as the plunger 625 is forced inwardly to occupy a portion of the volume of the annular groove 622, the rubber forces the ring 624 outwardly of the groove and forces the internally threaded element 611 toward the internally threaded element 610. Contact between the opposite sides of the threads of the cutter head adjusting screw 280 by the threads on the elements 610 and 611 effectively locks the cutter head in adjusted position, after which it is clamped down by the mechanism previously described.

Referring now to Figures 26 and 27, a cutter spindle 640 is mounted in the cutter head for axial reciprocation and for rotary feed. The cutter spindle has a reduced portion providing a shoulder 641, on which reduced portion is mounted a sleeve 642 in which the spindle 640 is relatively rotatable. For this purpose bearings 643 and 644 are provided at opposite ends of the sleeve 642, the bearing 643 being received between one end of the sleeve and the shoulder 641. The other bearing 644 is clamped against the opposite end of the sleeve 642 by an internally threaded locking ring 645.

Independent mechanism is provided for effecting the cutting reciprocation of the spindle and the timed rotary feed thereof. The mechanism for imparting timed rotary feed to the spindle will first be described.

Figure 21:
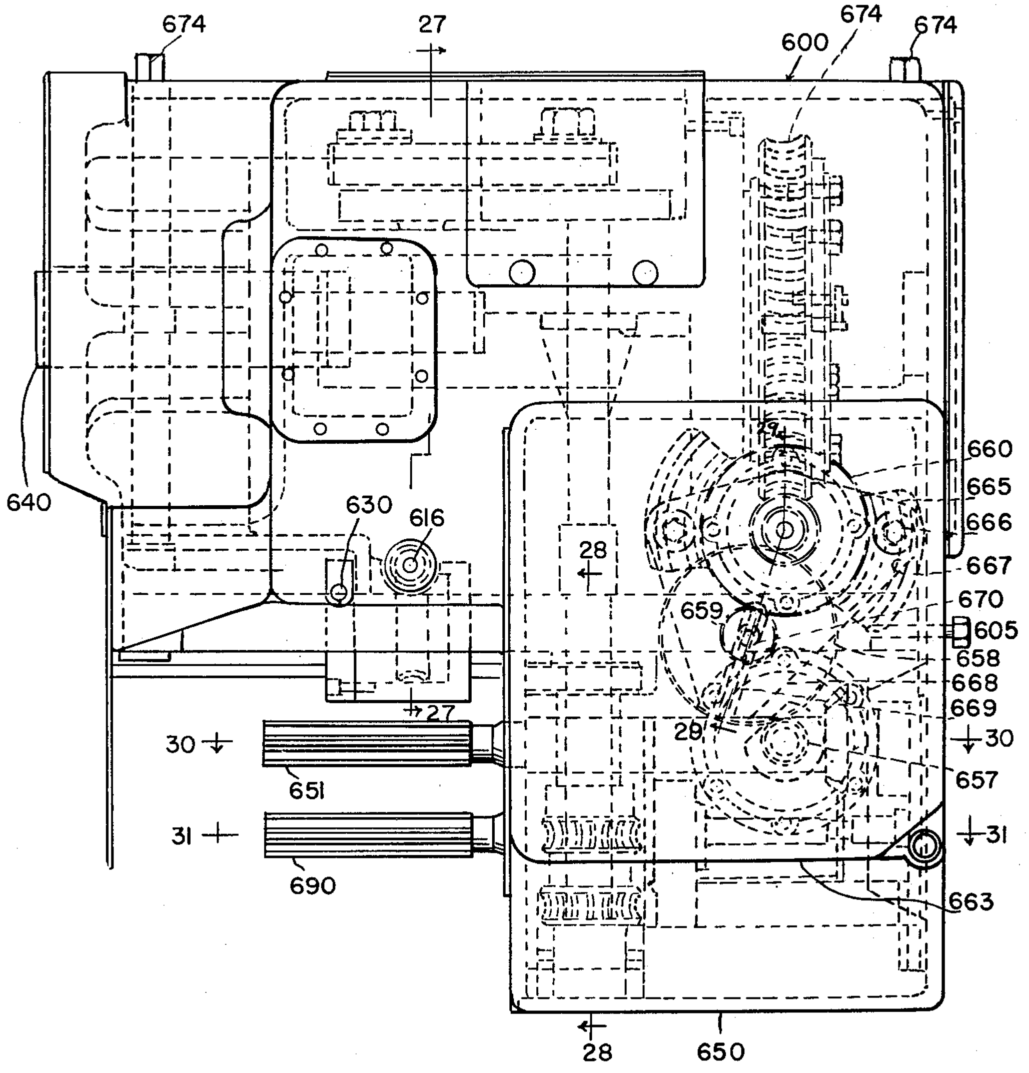
Figure 21 is a front elevation of the cutter head.

Referring now to Figures 21, 23, 26, 29 and 30, the cutter head is provided with a depending portion indicated generally at 650 which extends below the plane of the ways 13 into a recess formed in the top of the base 10. Projecting to the left from the depending portion 650, as best seen in Figure 21, is a splined timing shaft 651 adapted to be connected to the rotary feed timing shaft 30 carried by the base and to have relative axial motion with respect thereto as the cutter head 600 is adjusted longitudinally of its ways. Referring now to Figure 30, the cutter timing shaft 651 is supported in the depending portion of the cutter head frame 600 by spaced bearings 652 and 653. Keyed or otherwise secured to the shaft within the housing is a bevel gear 654 meshing with a second bevel gear 655 keyed or otherwise secured to a stub shaft 656 to which a pinion 657 is keyed or otherwise secured.

Figures 22, 25, 29:
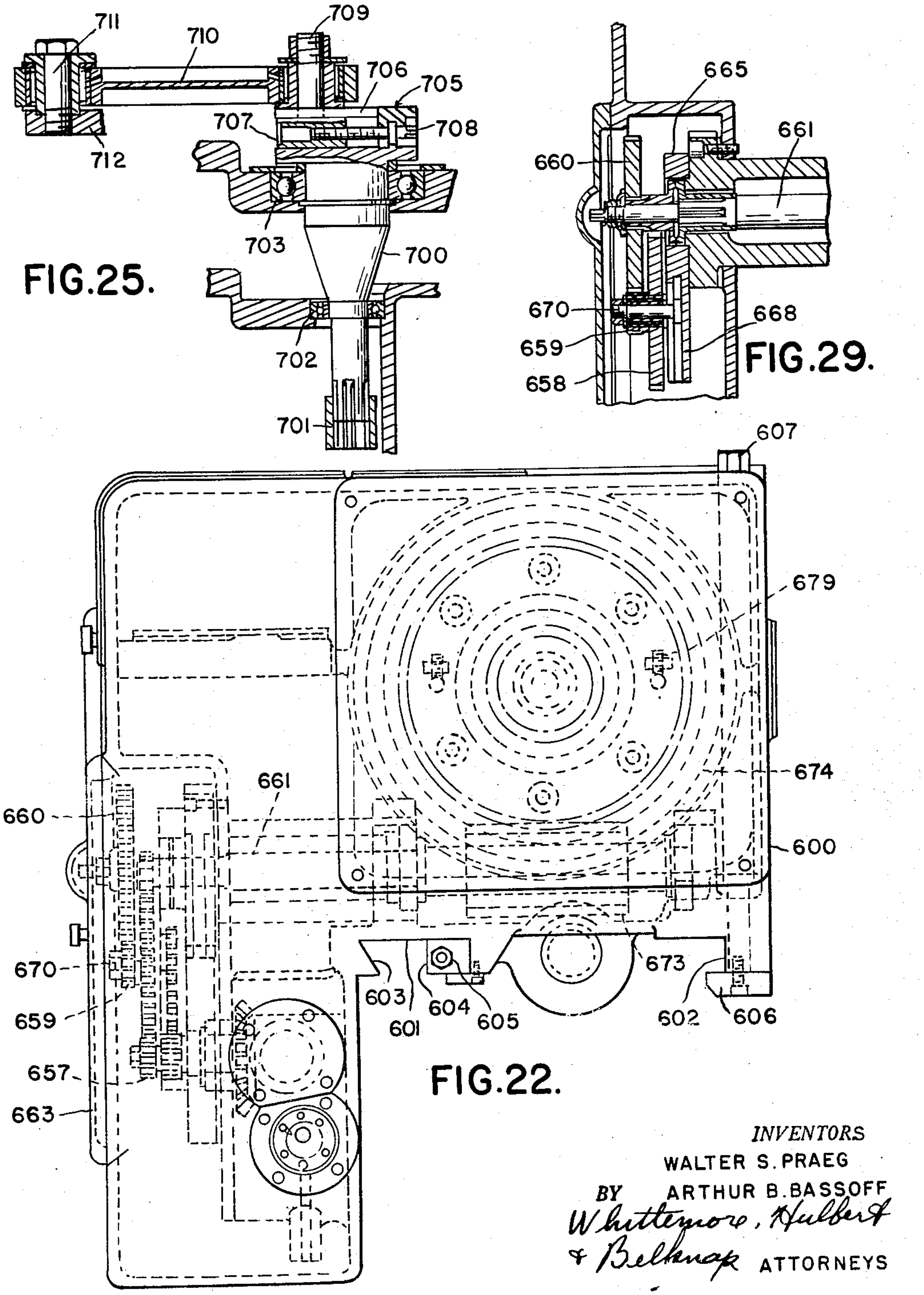
Figure 22 is a right side elevation of the cutter head.
Figure 25 is a section on the line 25—25, Figure 24.
Figure 29 is a section on the line 29—29, Figure 21.

As best seen in Figures 21, 22 and 29, the pinion 657 meshes with a large gear 658 which is keyed on a shaft carrying a second pinion 659, which pinion in turn meshes with a second large gear 660, the gear 660 being keyed or otherwise secured to the worm gear shaft 661.

The gears last referred to are rendered accessible by the provision of a removable cover plate 663 and means are provided for facilitating removal and replacement of change gears in the gear set just described. This means comprises a gear supporting plate 665 which is adjustable about the axis of the worm shaft 661 and may be clamped in adjusted position by clamping bolts 666 engaging members received in short arcuate T-slots indicated at 667. The plate 665 has an arm 668 which is formed with a radial slot 669 in which is adjustably mounted a stud 670 which stud mounts the gear-pinion set 658, 659. In order to change the ratio of the gears intermediate timing shaft 651 and the worm shaft 661 it is therefore only necessary to remove and replace the pinion-gear set referred to, the appropriate adjustment of the supporting plate 665 being made at the same time.

As best seen in Figure 26, the worm shaft 661 is provided with an elongated worm 673 which meshes with a relatively large worm timing gear indicated generally at 674. The worm gear 674 is made up of a gear section 675 integral with an elongated sleeve 676 which sleeve carries a second annular worm gear portion 677 which is mounted for angular adjustment with respect to the worm gear section 675 and may be locked in adjusted position with respect thereto by clamping bolts 678 or the like. Means for effecting relative angular adjustment between the parts is indicated in Figure 22 at 679 and comprises a pair of diametrically opposed adjusting screws carried by the part 677 and engaging pins carried by the part 675 and extending through enlarged openings in the part 677. This means is provided for the purpose of permitting take-up of the worm gear so as to eliminate backlash between the teeth of the worm gear 674 and the teeth of the worm 673.

It will be recalled that the cutter spindle 640 is mounted for reciprocation, and to permit this reciprocation while accurately preserving its rotary feed as a result of coaction between the cutter index worm 673 and worm gear 674 the following mechanism is provided. Keyed or otherwise rigidly secured to the inner end of the cutter spindle 640 is a splined male guide 680. This guide is longitudinally slidable in a correspondingly splined sleeve 681. As illustrated in Figure 26, sleeve 681 is an annular element which is keyed to adjustable collar 682 which in turn is keyed to sleeve 676 at 683 and is thereby held against relative rotary movement. The sleeve 681 is tapered to fit a tapered bore in sleeve 676 and is further provided with a plurality of spaced slots 684 extending alternately from opposite ends lengthwise nearly the full length of the sleeve.

Axial movement imparted to sleeve 681 by drawing collar 682 towards sleeve 676 forces the sleeve 681 to contract about male guide 680 thereby removing backlash and compensating for wear.

If the machine is to be employed for the cutting of spur gears the interfitting splines on the male guide 680 and the sleeve 681 are straight and parallel to the axes of the parts. If, however, the cutter is employed in the shaping of helical parts the interfitting splines of the guide and sleeve are formed to a like helix. In either case the guide and sleeve serve to impart rotary feed to the cutter spindle 640 in accordance with the rotation of the cutter rotary feed shaft 651.

Mechanism is provided for effecting relatively rapid cutting reciprocation of the cutter spindle 640 and this includes means for effecting dynamic balance of the moving parts, as will now be described. This mechanism is best seen in Figures 21, 22, 24, 25, 26, 27, 28 and 31.

Extending outwardly from the depending portion 650 of the cutter housing 600 is a main cutter drive shaft 690. As best seen in Figures 28 and 31, the spindle 690 is mounted in the depending portion 650 of the cutter housing between spaced bearings 691 and 692 and intermediate these bearings is formed or provided with a worm 693 adapted to drive a worm gear 694 keyed or otherwise secured to a vertical shaft 695. The shaft 695 is mounted in bearings 696 and 697 and is provided with an upwardly extending splined stub portion 698. The shaft 695 is coupled to a shaft 700, a sleeve coupling 701 for this purpose being indicated in Figure 25. The shaft 700 is supported by bearings 702 and 703, bearing 703 being designed to withstand substantial radial forces imparted by converting rotary motion of the shaft 700 to reciprocatory motion of the cutter spindle 640. At its upper end the shaft 700 is provided with an adjustable crank member 705 provided with a radially extending slot 706 in which is mounted a crank pin supporting block 707, the block being longitudinally adjustable in the slot by threaded adjusting means including the headed adjusting screw 708. By manipulation of the screw 708 the effective throw of the crank 705 is varied. The block 707 carries an upwardly extending crank pin 709 to which is connected one end of a link 710, the other end of the link embracing a sleeved crank pin 711 carried by a crank 712 (Figures 24 and 27). The crank 712 is keyed or otherwise secured to a short shaft 713 mounted between bearings 714 and 715 in the cutter head. The crank 712 as best seen in Figure 24, is provided with a radially extending counterbalance portion 716 diametrically oppositely disposed from the pin 711 with respect to the axis of the supporting shaft 713.

Keyed or otherwise secured to the shaft 713 in line with the axis of the cutter spindle 640 is a segmental pinion 717, one side of the pinion being provided with stepped flat surfaces as indicated at 718 and to the flat surface of this segmental pinion is bolted or otherwise secured a counterbalance weight 719.

Diametrically opposite sides of the sleeve 642 are provided with rack teeth as indicated at 720 for meshed engagement with the teeth formed segmentally on the pinion 717. At the opposite side of the sleeve 642 is mounted a substantially identical mechanism including a shaft 721 to which is keyed or otherwise secured a segmental pinion 722 having a stepped flat side as indicated at 723 (see Figure 24). A counterbalance 724 identical with the counterbalance 719 previously described is bolted or otherwise secured to the pinion 722.

The radius of rotation of the crank pinion 709 is in all cases less than the radius of rotation of the crank pin 711 and accordingly rotation of the shaft 700 will result in back and forth oscillation of the shaft 713. Oscillation of the shaft 713 produces through the coaction of the teeth of the pinion 717 and the rack teeth 720 a corresponding reciprocation of the cutter spindle 640. Reciprocation of the cutter spindle 640 through the coaction of the rack teeth 720 at the opposite side of the sleeve 642 with the teeth of the pinion 722 results in a corresponding back and forth oscillation of the pinion 722 and the counterbalance 724 about the axis of the shaft 721. This arrangement is calculated to provide for diametric balance in the operation of the machine and thereby to avoid vibration, heavy stresses on reversal of the cutter spindle, and the like. As the cutter spindle 640 moves outwardly, counterbalances 719 and 724 rotate about the axes of the shafts 713 and 721 respectively, the direction of motion of the counterbalances being mainly opposed to the direction of motion of the cutter spindle. Inasmuch as the means for converting rotary motion of the shaft 700 to back and forth reciprocatory motion of the spindle 640 includes a crank, it will be understood that the velocity of reciprocation is a maximum at the middle of the stroke and falls off at either end of the stroke so that sudden changes of direction of the spindle do not occur. Furthermore, at all times that a substantial mass is moving in one direction, such for example as the movement of the spindle, this motion is effectively dynamically counterbalanced by a substantial opposite movement of a dynamically equally effective mass in the opposite direction.

WORK HEAD

The work head 800, best illustrated in Figures 32–36, is mounted on the base for longitudinal sliding movement on the ways 12. During the operation of the machine, as previously described, the cutter head is locked on the base and both reciprocating and rotary feed movement is imparted to the cutter spindle. The necessary relative movements between the cutter spindle and the work spindle are provided by corresponding rotary feed of the work spindle together with a relative radial feed thereof which may be continuous or intermittent and which is in a direction to vary the depth of cut of the cutter carried by the cutter spindle.

The work head 800 comprises a main casting 801 provided at its undersurface with rectilinear guiding surfaces slidable on the ways 12 on the base. An adjusting gib 802 is preferably provided to assure accuracy of guided movement of the work head on the base, and hold down strips 803 and 804 are provided.

Figures 32, 35:
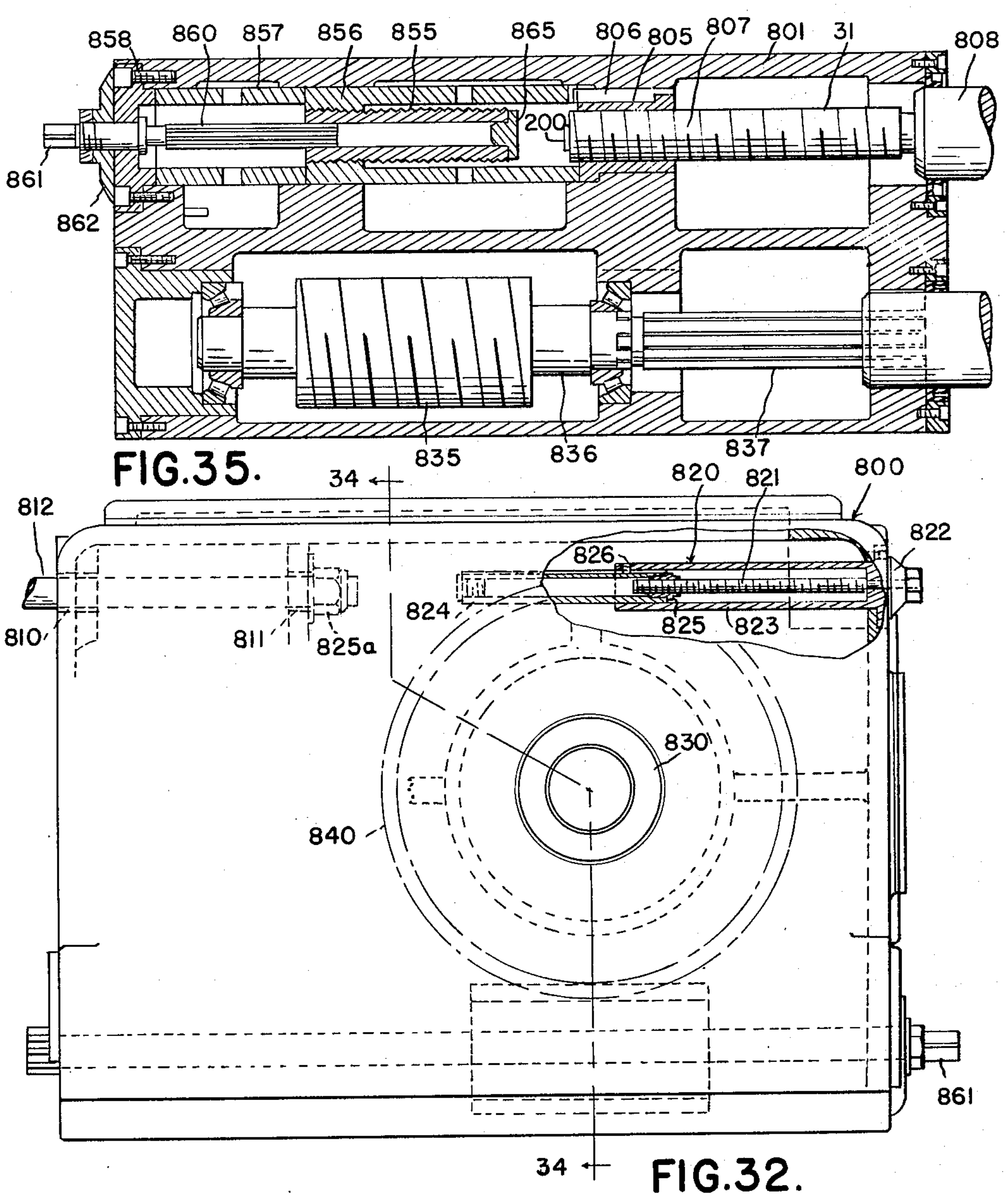
Figure 32 is a left side elevation of the work head.
Figure 35 is a section on the line 35—35, Figure 34.
Figure 36:
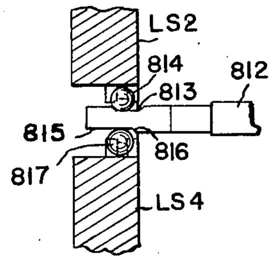
Figure 36 is a detail view partly in section, of limit switches and the actuator shown in Figure 32.

The means for effecting sliding movement of the work head on the base comprises a feed nut 805 keyed or otherwise secured in the head as indicated at 806 and adapted to receive the threaded end 807 of a feed drive shaft 31 which extends into the work head from the upwardly projecting transmission housing 11 formed on the base. As previously described, the shaft 31 may be driven relatively rapidly by the separate rapid traverse motor 210, or it may be driven with a slow constant rotation through the constant infeed mechanism, or it may be driven intermittently by the intermittent infeed mechanism previously described. Means are provided for controlling the rapid traverse motor and associated mechanism and this means comprises a pair of limit switches LS2 and LS4 located in the upwardly projecting work head transmission housing 11 as best seen in Figures 32 and 36. Slidably mounted in a first bushing 810 provided in a wall of the work head and a second bushing 811 provided in a transverse web in the work head is a limit switch actuating rod 812. The end of the rod 812, as best seen in Figure 36, is provided with a notch 813 in which is received the roller 814 of the limit switch LS2. At the opposite side of the end of the rod 812 is a flattened portion 815 forming a cam surface 816 which cooperates with a roller 817 of the limit switch LS4. Extending through the opposite wall of the work head is an adjustable screw device indicated generally at 820 comprising a screw 821 rotatable by a headed portion of dial plate 822, and received with tube 823. Abutment tube 824 has rigidly secured therein a nut 825 which engages threads of screw 821, and is further keyed against rotation in tube 823 as shown at 826. In operation of the head, the limit switch actuating rod 812 remains stationary except at the limits of rapid traverse motion of the work head, at which time engagement between a nut 825*a* and the intermediate web causes movement of the rod 812 to the right as seen in Figure 32; and correspondingly at the opposite limit of rapid traverse motion the end of tube 824 engages the inner end of the rod 812 and moves the rod in the opposite direction. This will result in actuation of the limit switch LS4 when the work head has reached the limit of rapid traverse in a direction away from the work head transmission housing 11, and in actuation of the limit switch LS2 when the work head reaches its limit of rapid traverse in a direction toward the work head transmission housing 11.

The work supporting spindle is indicated at 830 and is supported in the work head housing 801 in relatively heavy thrust bearings 831 and 832, these bearings being adaptable to permit rotation of the work spindle and at the same time to withstand the cutting thrust of the cutter.

Figures 33, 34:
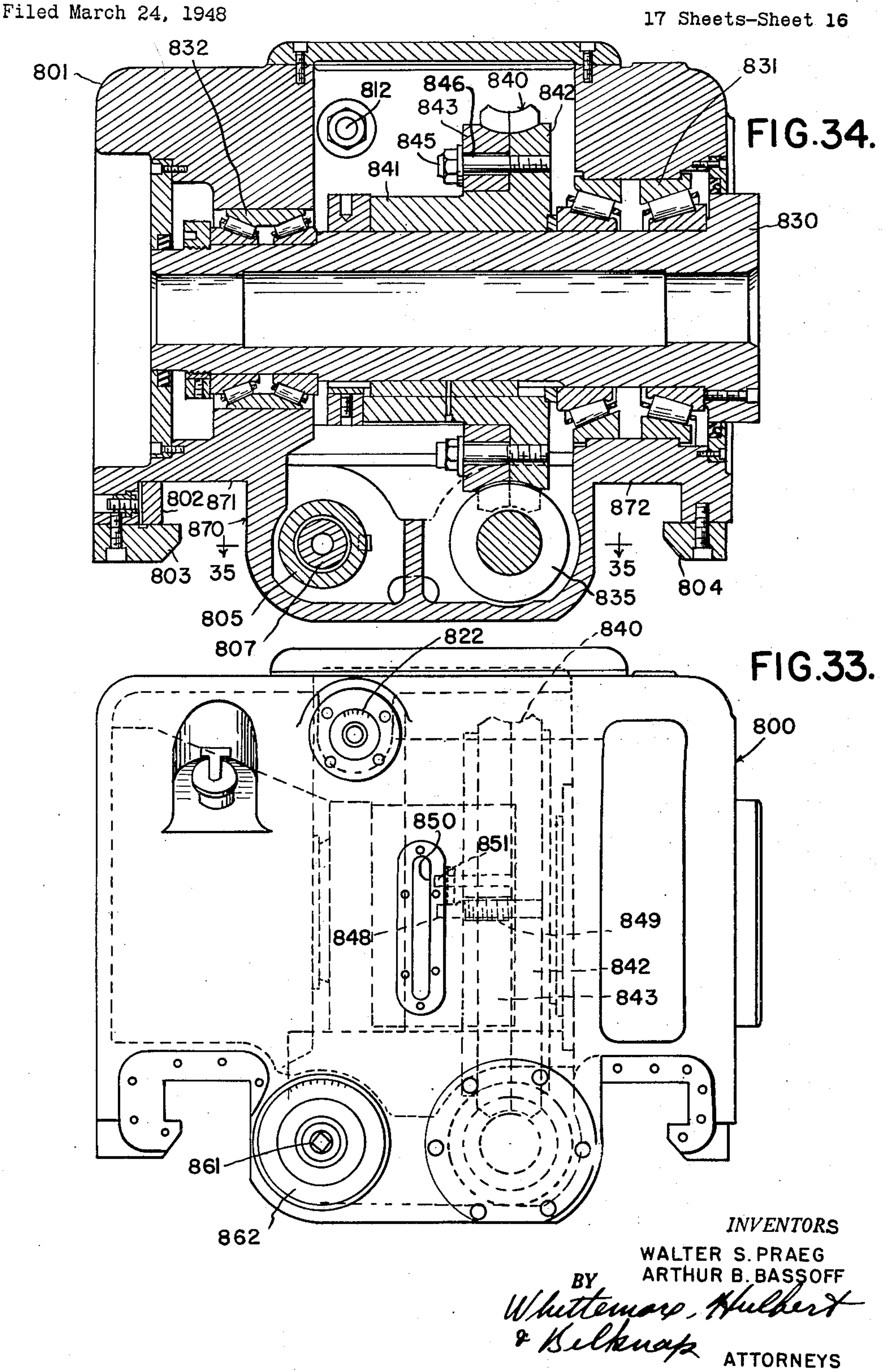
Figure 33 is a front elevation of the work head.
Figure 34 is a section on the line 34—34, Figure 32.

The means for effecting rotary feed of the work spindle comprises a worm 835 provided on or formed as a part of a shaft 836, one end of this shaft being splined as indicated at 837 for connection to the work head rotary feed shaft 32 extending from the upwardly projecting work head transmission housing 11. Keyed to the work spindle 830 is a worm gear assembly 840 which comprises a sleeve 841 having a radially extending flange 842, the outer portions of which are formed as worm gear teeth. Mounted on the sleeve 841 is an annular member 843, the outer portion of which is machined to provide worm gear teeth which may be an extension of the worm gear teeth formed on the flange 842. The annular member 843 is clamped against the flange 842 by screws 845 and the openings 846 in the annular member 843 through which the screws 845 extend are circumferentially elongated so as to permit slight relative adjustment between the flange 842 and the annular member 843. Preferably means are provided for facilitating the relative adjustment between the parts and may take the form of pins 848 rigidly secured in the flange 842, as best seen in Figure 33, these pins extending through enlarged openings 849 in annular member 843. The annular member 843 is provided with outwardly extending posts 850 into which are threaded adjusting screws 851 adapted to bear against the pins 849. As will be readily apparent, angular adjustment between the annular member 843 and the flange 842 may be effected by rotation of adjusting screws 851 in the appropriate direction and after such adjustment has been accomplished the parts are locked in adjusted position by tightening the clamping screws 845.

This permits take-up of backlash between the worm 835 and the worm gear composed of the flange 842 and the annular member 843.

It is desirable that means be provided to assure extreme accuracy in the location of the work head at its position of furthest infeed, since this position determines the final dimensions of the gear produced by the machine. This means is illustrated in Figure 35 and comprises a dead stop abutment sleeve 855 adjustably threaded within a sleeve 856, this sleeve in turn abutting a second sleeve 857 which engages a closure plate 858 bolted to the work head housing 801. A splined shaft 860 is rotatably mounted in the closure plate 858 and is provided at its outer end with a squared portion 861 for the reception of a hand tool and is further provided with a dial plate 862 which as seen in Figure 33 may be graduated to indicate the setting of the dead stop abutment. The splined shaft 860 is slidably received within a corresponding internally splined portion of the abutment sleeve 855, and accordingly rotation of the shaft 860 results in axial movement of the abutment sleeve 855. An abutment element 865 is fixed at the inner end of the abutment sleeve 855 and is adapted to engage the end of the end portion 807 of the shaft 31 and to provide a mechanical dead stop which will accordingly determine the position of the work head in its position for final cutting of the gear. Engagement of abutment element 865 with member 230 also operates LS3 to terminate infeed and energize rapid traverse motor 210 in a forward direction, as previously mentioned.

Referring to Figures 1 and 34, the ways 12 supporting the work head are provided in a particular relationship with respect to the axis of the work spindle. The way associated with the gib 802 and the hold-down strip 803 is intended to support the thrust developed by the cutting stroke and for this purpose it is positioned such that a line joining this way and the cutting zone of the work gear W makes a relatively small angle, as indicated by the angle A in Figure 1. Accordingly, during the cutting stroke the cutting thrust is primarily against the surface 870 of the work head and this surface, as will be readily apparent from an inspection of Figure 34, may be maintained in close sliding engagement with the surface of the cooperating way by suitable adjustment of the adjusting gib 802. While the weight of the work head will normally be supported from the surfaces 871 and 872, when the cutting thrust is effective it is expected that the upper surface of the holding-strip 804, engaging under a correspondingly shaped portion of the cooperating way 12, will be in engagement and will limit movement of the work head off its ways. The foregoing construction provides for the most efficient support for the cutter head and insures its substantial rigidity during the cutting stroke while at the same time providing for the necessary freedom of movement to permit the in-feeding motion to take place.

ELECTRICAL CONTROL SYSTEM

Figure 37:
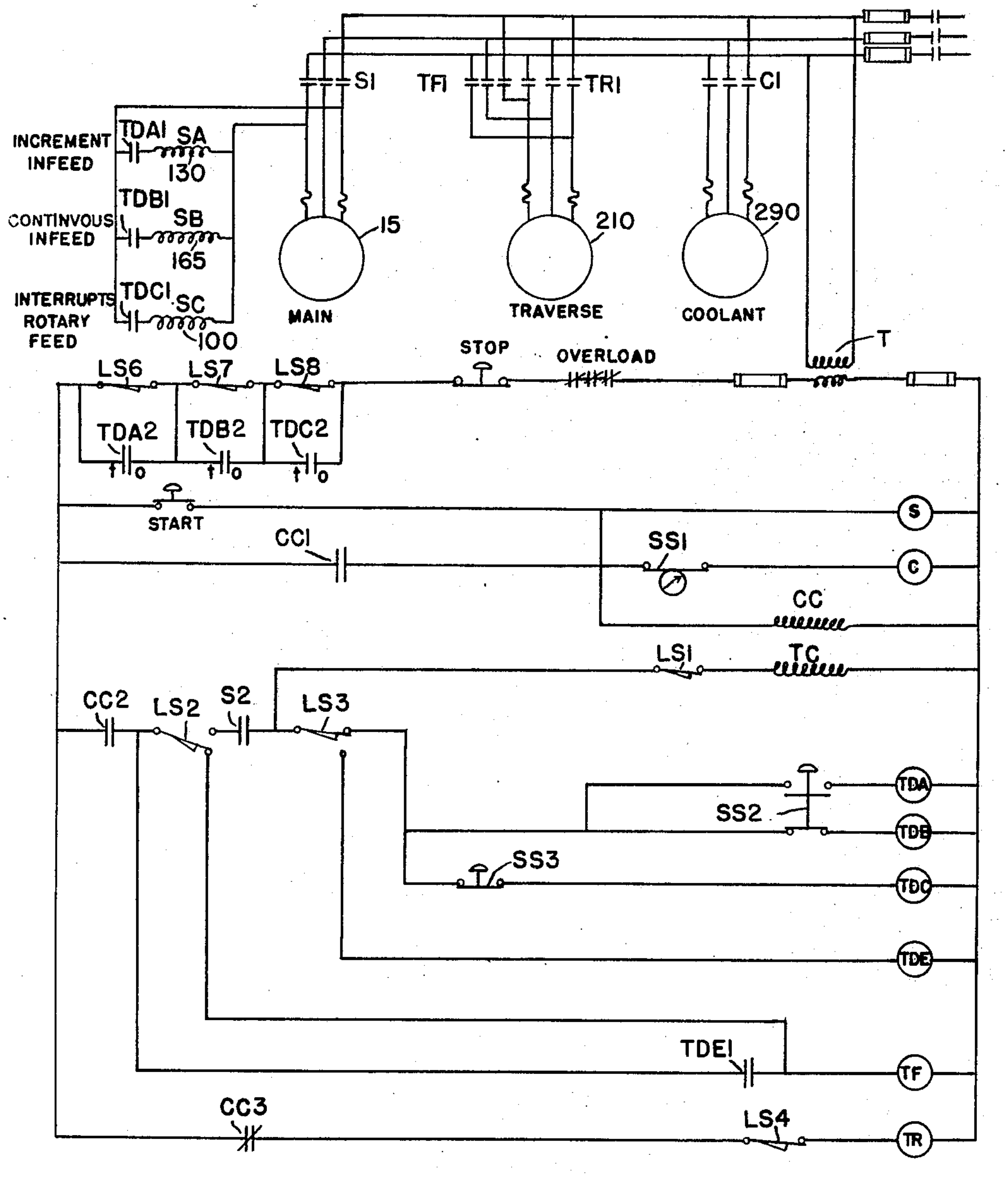
Figure 37 is a simplified wiring diagram for the machine.

Referring now to Figure 37, the electric control system for the improved gear cutting machine is illustrated. In this figure there is illustrated a main drive motor 15 which effects reciprocation of the cutter spindle, and rotational in-feed of the work head and rotary feed of the cutter spindle and the work spindle; a rapid traverse motor 210 whose function is to effect rapid traverse of the work head from loading position to initial cut position and back and in addition to operate as means for holding the work head firmly against a rigid abutment or dead stop; and a coolant motor 290 connected to a suitable pump for supplying coolant to the cutting zone. These motors are connected across a conventional 3-wire circuit as illustrated.

In this diagram relays are indicated by circles in which are inscribed letters designating the function of the relay. Switch contacts actuated by the relay are illustrated as parallel lines across a conductor, normally closed switch contacts being indicated by a diagonal line crossing the parallel lines and bear the same distinguishing letters as the relay which operates them, as well as a distinguishing numeral.

The power circuit has connected across two of its leads three solenoids, each of which is connected in series with normally open relay controlled contacts. The solenoid SA is the solenoid 130 which is adapted when energized to provide for increment in-feed of the work head. The solenoid SB which is the solenoid 165 of the drawings is adapted when energized to provide for continuous in-feed of the work head. The solenoid SC which is the solenoid 100 of the drawings is adapted when energized to disengage clutch elements 57 and 59 to interrupt rotary feed of the work and cutter spindles.

A transformer designated T is connected across the power circuit and supplies current for the control circuit which includes the relays and limit switches provided to effect control of the machine. Control circuit from the transformer includes conventional overload switches, a stop switch and limit switches LS8, LS7, and LS6 all in series to the starting button zone. When the starting button is closed current passes to the relay S, thus closing normally open switch contacts S1 in the power lines leading to the main motor 15. This starts the motor 15 running, which initiates reciprocation of the cutter spindle and rotation of the cutter spindle and work spindle. In addition, closure of the starting button closes a circuit to the relay C which closes contact C1 in the power leads to the coolant motor 290. In this last circuit is a selector switch SS1 which may if desired be opened to prevent energization of the relay C in the event that an operation is to be performed in which coolant is not desired. Finally, closure of the starting button energizes the counter coil CC which is a holding coil, which closes normally open contact CC1 and thereby establishes a holding circuit to the relays S, C and CC which will remain closed after the starting button is opened. At the same time, energization of the counter coil CC closes normally open contact CC2 which establishes a circuit to the traverse forward relay TF. This relay closes normally open switch contacts TF in the power circuit to the rapid traverse motor 210 and initiates rapid traverse of the work head toward cutting position. At the same time, energization of countercoil CC opens normally closed contact CC3 which interrupts the circuit to the traverse reverse relay TR.

At this time the work head is traversed rapidly toward the cutting zone, the cutter spindle is being reciprocated and the cutter spindle and the work spindle are being given a rotary feed motion.

Previous to starting the machine the selector switch SS2 is positioned to close a circuit to either the relay TDA or the relay TDB, depending upon whether increment in-feed or continuous in-feed is to be employed.

As the work head reaches cutting position the rod 812 (Figure 36) is engaged and actuates limit switch LS2 to move the limit switch from the position shown in the figure to engage the upper contact. Movement of the contact in the limit switch LS2 from the illustrated position to the upper position opens the circuit to the relay TF, which in turn permits normally open contacts TF to open to interrupt the circuit to the rapid traverse motor 210. This terminates rapid traverse forward movement of the work head. In addition, upward movement of limit switch LS2 closes a circuit through contacts S2 (which were closed when relay S was first energized) through limit switch LS3 to relay TDA or TDB, depending upon the position of selector switch SS2. In the wiring diagram the selector switch SS2 is shown in position to complete the circuit to the relay TDB. Energization of the relay TDB closes contacts TDB1 to the solenoid SB (165 of the drawings) which engages the clutch contained in the clutch housing 161 so that continuous in-feed takes place. At the same time a circuit is closed to the relay TDC through the selector switch SS3. Energization of the relay TDC closes contacts TDC1 to the solenoid SC (the solenoid 100 of the drawings) which operates to disengage the clutch including the clutch sleeve 57 so that rotary feed of both the cutter and work spindle is prevented. If selector switch SS2 were in its other position, the circuit would be closed to the relay TDA rather than to the relay TDB and energization of the relay TDA would close normally open contacts TDA1 to the solenoid SA (the solenoid 130 in the drawings) which would remove the blanking plate 125 from between the pawl 123 and the teeth of the ratchet disk 124.

As thus far described the work head has been rapidly advanced to initial cutting position and has been thereafter advanced with either a continuous or an incremental in-feed as determined by the position of selector switch SS2. This in-feed is accompanied by rotary feed provided that selector switch SS3 is open, and if selector switch SS3 is closed in-feed is accomplished without rotary feed. It will be recalled that the rotary feed may be incremental or continuous as determined by the position of pinion 47, the pinion 47 being in the position 47c if continuous in-feed is desired and in the position 47i if incremental in-feed is desired.

In-feeding operation continues until the movable button 200 associated with the work head feed screw 31 engages the adjustable abutment 865 (Figure 35) at which time the limit switch LS3 is moved from the position shown in Figure 37 to the lowermost position. This breaks the circuit to the relay TDB, causing normally open contacts TDB1 to open and disengages the solenoid SB, thereby permitting disengagement of the clutch actuated thereby. This terminates in-feed. In the event that the selector switch SS2 were in the position to energize the relay TDA movement of the limit switch LS3 as above mentioned will de-energize the relay TDA permitting normally open contacts TDA1 to open, thus de-energizing the solenoid SA. The blanking plate 125 is thereby returned by spring action to be interposed between the pawl 123 and the teeth of the ratchet disk 124. In either event, the mechanism for carrying out in-feed is interrupted.

Simultaneously, movement of the limit switch LS3 to the lowermost position closes a circuit to the relay TDE which closes normally open contacts TDE1, passing current to the traverse forward relay TF which again closes normally open contacts TF1 controlling the forward circuit to the rapid traverse motor 210. The rapid traverse motor 210 is a torque motor and when energized is designed to apply torque to the driving mechanism connected thereto. Since the energization of the torque motor 210 is in a forward direction this causes the torque motor to hold the work head firmly against the dead stop so that the further machining operations are carried out with the parts held in the most rigid manner.

Movement of the limit switch LS3 to the lowermost position as previously described further has the effect of breaking the circuit to the relay TDC which in turn opens the normally open contacts TDC1 to the solenoid SC (the solenoid 100 of the drawings) permitting the spring to re-engage the rotary feed clutch to cause resumption of rotary feed of the cutter and work spindle.

The counter which includes the holding coil CC also includes a timing coil TC which may be preset to control the cycle of the machine. Included in series with the timing coil TC is the limit switch LS1 which is energized through the medium of the push rod 252 (Figure 12) to count once for each revolution of the gear 250. By setting the counter for the desired number of strokes the machine will continue in operation until the gears are completely cut, at which time the timing coil TC counts out and de-energizes holding coil CC, thus permitting normally open contacts CC1 to open and thereby breaking the circuit to relays S and C and stopping motors 15 and 290. Normally closed contacts CC3 are now closed to cause current to flow through traverse reverse coil TR which closes normally open contacts TR1 in the reverse circuit to the rapid traverse motor 210, thus initiating a rapid return of the work head from final cutting position to loading position. As the work head reaches loading position, surface 816 on the rod 812 actuates limit switch LS4 to open position, thereby breaking the circuit to the traverse reverse relay TR and stopping traverse of the work head, thus completing the cycle.

Relays TDA, TDB and TDC each comprise two sets of normally open contacts TDA1, TDA2, TDB1, TDB2, TDC1 and TDC2 respectively. Contacts TDA1, TDB1 and TDC1 are quick operating contacts adapted to close and open circuits to the corresponding solenoids immediately upon energization or de-energization of the corresponding relays. Contacts TDA2, TDB2 and TDC2, however, are time delay contacts associated with means to provide for a small time delay in opening. These last mentioned contacts are connected respectively in parallel with the limit switches LS6, LS7 and LS8 associated with the solenoid SA, SB and SC, which limit switches are connected in series in the main control circuit. Accordingly, as each of the solenoids is energized it moves an operating lever away from the corresponding limit switch. The limit switch opens the main control circuit but the relay which controls the solenoid simultaneously establishes a parallel bridging circuit around the limit switch so that there is no interruption in current flow. When the solenoid is de-energized a spring returns the mechanism to original position. Since the return of the mechanism into original position by the spring requires a definite interval of time and since the limit switch will remain open until the mechanism has returned to original position, this would interrupt the flow of current in the main control circuit. However, contacts TDA2, TDB2 and TDC2 are each provided with means establishing a small time delay in opening, this time delay being sufficient to insure return of the mechanism to original position so as to close corresponding limit switch before the by-pass contacts open. The time delay mechanism is preferably in the form of a pneumatic timer, details of which form no part of the present invention. If the mechanism fails for any reason to return to its original position the main control circuit is opened when the time delay by-pass circuit opens. Thus if mechanical failure or any cause prevents proper operation of the mechanism controlled by the solenoids, the main control circuit is interrupted and the machine will stop. This is a safety feature designed to interrupt operation of the machine upon failure of the machine to function in the required manner.

What we claim as our invention is:

1. In a gear shaping machine, a work and a tool spindle, rapid traverse means including a first motor for effecting relative radial approach between said spindles from a loading position to a cutting position, other means including a second motor for effecting a radial depth infeed between said spindles, means for de-energizing said first motor and energizing said second motor to initiate depth feed, rigid abutment means limiting depth feed, and means responsive to completion of depth feed to de-energize said second motor and re-energize said first motor to apply a force in the direction of further depth feed.

2. In a gear shaping machine, a base, a work head, a tool head, means for feeding one of said heads in a direction radially of the other, a torque motor selectively coupled to said means for effecting rapid traverse, a second motor selectively coupled to said means for effecting slow depth feed, an adjustable rigid abutment engageable with one head, and means operable upon completion of depth feed to de-energize said second motor and to energize said torque motor to cause said one head to remain firmly against said abutment.

3. A gear shaping machine comprising a base, a work head and a tool head on said base, parallel work and tool spindles on said heads, depth feed transmission means for moving said work head in a direction radially of said spindles, a rapid traverse motor connected to said transmission, incremental depth feed means connected to said transmission comprising a cam actuated pawl and ratchet device and means for rendering said pawl and ratchet inoperative, continuous slow depth feed means, a clutch for selectively connecting said slow depth feed means to said transmission, locating means comprising rigid abutments engageable when said work head is in full depth cutting position, and means for interrupting said depth feed means and for energizing said rapid traverse motor in a forward direction when said work head reaches full depth position.

4. In a machine tool, a work support, a tool support, transmission means for relatively moving said supports between separated loading position, initial cutting position and final cutting position, a rapid traverse motor connected to said transmission means, depth feed means operable to drive said transmission means, positioning means comprising rigid abutments engageable when said supports are in final cutting position, and means interrupting said depth feed means and energizing said rapid traverse motor in a forward direction when said supports are in final cutting position.

5. In a gear shaping machine, a pair of spindles, a depth feed transmission for causing relative depth feed between said spindles, said transmission comprising a continuously rotating drive member, a normally disengaged clutch for connecting said member to said transmission, a solenoid effective when energized to engage said clutch, an incremental feed member for driving said transmission, a cam actuated pawl and ratchet for intermittently rotating said incremental feed member, means normally rendering said incremental feed member inoperative, and a solenoid effective when energized to render said incremental feed member operative.

6. In a gear shaping machine, a pair of spindles, a depth feed transmission for causing relative depth feed between said spindles, said transmission comprising a continuously rotating drive member, a normally disengaged clutch for connecting said member to said transmission, a solenoid effective when energized to engage said clutch, an incremental feed means for driving said transmission, a cam actuated pawl and ratchet for intermittently rotating said incremental feed member, masking means normally interposed between said pawl and ratchet, and a solenoid effective when energized to withdraw said masking means from between said pawl and ratchet.

7. In a machine tool, a base, ways on said base, a slide on said ways, a feed screw and nut for effecting movement of said slide on said ways, an adjustable abutment adjacent the end of said feed screw engageable therewith to limit movement of said slide, drive means for effecting relative rotation between said screw and nut, and control means operable substantially upon engagement between said abutment and screw to interrupt operation of said drive means, said control means comprising a spring biased push rod extending through said screw and projecting slightly therebeyond to engage said abutment.

8. A gear shaping machine comprising a work spindle, a cutter spindle, rapid traverse means for causing approach of said spindles from loading to initial cutting position, depth feed means for causing slow depth feed between said spindles from initial to final cutting position, rotary feed means for causing timed slow rotation of said spindles, drive means for causing relative axial reciprocation between said spindles, control means comprising a starting switch for initiating rapid traverse forward and reciprocation between said spindles, a selector switch for selectively controlling rotary feed between said spindles until full depth cutting position is reached, means responsive to completion of rapid traverse to initiate slow depth feed, counter means operable to time the cycle to cause a predetermined rotation of the work spindle, and means operable upon attainment of full depth cutting position to initiate operation of said counter means and to initiate operation of said rotary feed means if its operation has been selectively omitted during slow depth feed, said counter means being effective upon completion of the predetermined rotation of said work spindle to initiate reverse rapid traverse and to terminate rotary feed and relative axial reciprocation between said spindles.

9. A gear shaping machine comprising parallel cutter and work spindles for use with a flexible cutter movable to cutting clearance position during cutting strokes in both directions, selectively operable continuous and incremental depth feeding means for effecting relative radial feed between said spindles, selectively operable continuous and incremental rotary feed means for effecting timed rotation of said spindles, means for effecting relative axial reciprocation without variation in spindle spacing after completion of depth feed between said spindles to cause a tool carried by said cutter spindle to make cutting strokes in both directions with respect to a work gear carried by said work spindle and means for effecting a complete rotation of said work spindle and a corresponding rotation of said cutter spindle in timed relation thereto, while the relative axial reciprocation without variation in spindle spacing is continued.

10. A gear shaping machine comprising a base, a work head and a tool head on said base, parallel work and tool spindles carried by said heads, means for feeding said work head radially of said tool spindle comprising a work feed shaft fixed on said base with which said work head is slidably associated, a work spindle drive shaft fixed on said base with which said work head is slidably associated, said cutter head being adjustable on said base in a direction parallel to the axis of said work spindle, a cutter spindle rotary drive shaft fixed on said base with which said cutter head is slidably associated, a cutter spindle main drive shaft fixed on said base with which said cutter head is slidably associated, a main drive motor in said base, and transmission means connecting said motor to all of said shafts.

11. A gear shaping machine comprising a base, a work head and a tool head on said base, parallel work and tool spindles carried by said heads, means mounting said work head for movement radially of said tool spindle, means mounting said tool head for movement parallel to the axis of said work spindle, a main drive motor in said base, a work spindle rotary feed drive shaft and a work head feed drive shaft fixed on said base and slidably associated with said work head, a cutter spindle rotary feed drive shaft and a cutter spindle main drive shaft fixed on said base and slidably associated with said cutter head, and transmission means connecting said motor with all of said shafts.

12. A gear shaping machine comprising a base, a work head and a tool head on said base, parallel work and tool spindles carried by said work head and tool head respectively, means mounting said work head for movement radially of said tool spindle, means mounting said tool head for adjustment parallel to the axis of said work spindle, a motor in said base, drive means in said tool head for effecting axial reciprocation of said tool spindle, tool timing means including parts within said tool head for rotating said tool spindle, transmission means including slidably associated members for transmitting power from said motor to said drive and tool timing means, work timing means including parts within said work head, and transmission means including slidably associated members for transmitting power from said motor to said work timing means.

13. A machine as defined in claim 12 which comprises means within said tool head for adjusting the stroke of said tool spindle.

WALTER S. PRAEG.
ARTHUR B. BASSOFF.

References Cited in the file of this patent

UNITED STATES PATENTS

| Number | Name | Date |
|---|---|---|
| 868,159 | Coventry | Oct. 15, 1907 |
| 879,531 | Fellows | Feb. 18, 1908 |
| 1,188,219 | Sykes | June 20, 1916 |
| 1,340,811 | Ballman | May 18, 1920 |
| 1,438,405 | Shaw et al. | Dec. 12, 1922 |
| 1,440,512 | Wais | Jan. 2, 1923 |
| 1,577,975 | Klausmeyer | Mar. 23, 1926 |
| 2,145,355 | Jereczek | Jan. 31, 1939 |
| 2,155,680 | Pfauter | Apr. 25, 1939 |
| 2,266,889 | Miller et al. | Dec. 23, 1941 |
| 2,332,570 | Grossarth | Oct. 26, 1943 |
| 2,336,760 | Sykes | Dec. 14, 1943 |
| 2,394,757 | Drummond | Feb. 12, 1946 |
| 2,398,346 | Anderson | Apr. 16, 1946 |